United States Patent [19]
Yamamoto et al.

[11] Patent Number: 5,748,599
[45] Date of Patent: May 5, 1998

[54] HOLOGRAPHIC OPTICAL DEVICE

[75] Inventors: Hiroaki Yamamoto, Katano; Tetsuo Saimi, Hirakata; Seiji Nishino, Osaka; Yoshiaki Komma, Kyoto; Hidenori Wada, Sakai, all of Japan

[73] Assignee: Matsushita Electric Industrial Co., Ltd., Osaka-fu, Japan

[21] Appl. No.: 785,542

[22] Filed: Jan. 17, 1997

Related U.S. Application Data

[62] Division of Ser. No. 495,137, Jun. 28, 1995.

[30] Foreign Application Priority Data

Jun. 30, 1994 [JP] Japan ................ 6-149231

[51] Int. Cl.[6] ........................................ G11B 7/00
[52] U.S. Cl. ............ 369/103; 369/109; 369/112; 369/44.24; 369/44.42
[58] Field of Search ............... 369/44.11, 44.12, 369/44.37, 44.38, 44.39, 44.41, 44.42, 109, 103, 110, 112, 44.24

[56] References Cited

U.S. PATENT DOCUMENTS

| | | |
|---|---|---|
| 4,945,529 | 7/1990 | Ono et al. . |
| 5,168,485 | 12/1992 | Lehureau et al. . |
| 5,231,620 | 7/1993 | Ohuchida . |
| 5,233,444 | 8/1993 | Musha . |
| 5,367,403 | 11/1994 | Yamamoto et al. . |
| 5,406,543 | 4/1995 | Kobayashi et al. . |
| 5,495,461 | 2/1996 | Komma et al. . |

FOREIGN PATENT DOCUMENTS

| | | |
|---|---|---|
| 0311340 | 4/1989 | European Pat. Off. . |
| 0452793 | 10/1991 | European Pat. Off. . |
| 0565052 | 10/1993 | European Pat. Off. . |
| 0608432 | 8/1994 | European Pat. Off. . |
| 0612068 | 8/1994 | European Pat. Off. . |
| 63-314502 | 12/1988 | Japan . |
| 02121131 | 7/1990 | Japan . |
| 3-029129 | 2/1991 | Japan . |

*Primary Examiner*—Paul W. Huber
*Attorney, Agent, or Firm*—Panitch Schwarze Jacobs & Nadel, P.C.

[57] ABSTRACT

A light beam emitted from a semiconductor laser element is collimated by a collimating lens, and is applied to an optical disk through a polarizing holographic beam splitter, a $\lambda/4$ plate and an objective lens, a light beam reflected by the optical disk is applied to the polarizing holographic beam splitter and is diffracted. Diffracted light beams of +1st order and −1st order are applied to two photodetectors, and a focus error signal and a tracking error signal are obtained on the basis of the diffracted light beam of +1st order and an information signal is obtained on the basis of the diffracted light beam of −1st order.

11 Claims, 20 Drawing Sheets

HOLOGRAPHIC OPTICAL DEVICE

This is a division of application Ser. No. 08/495,137, filed Jun. 28, 1995, pending.

FIELD OF THE INVENTION AND RELATED ART STATEMENT

1. Field of the Invention

The present invention relates to an optical head device which records, reproduces or erases information on an optical medium or a magneto-optical medium such as an optical disk and an optical card.

2. Description of the Related Art

Application of optical memory technic using an optical disk having pit patterns to a memory medium of a high density and a large capacity is expanding to a digital audio disk, a video disk, a document file disk and a data file disk. In the optical memory technic, information are recorded in and reproduced from the optical disk with high accuracy and reliability by using a converged light beam. The characteristics of recording and reproducing operations entirely depend on its optical system.

A fundamental function of the optical head device which is a main part of the optical system is roughly divided into (i) light convergence for forming a microscopic light beam spot of a diffraction limit, (ii) focusing control and tracking control of the optical system, and (iii) detection of a pit signal. These items are realized by combination of various optical systems and photoelectric conversion-detection methods corresponding to objects and uses.

Recently, use of hologram for an optical head device is disclosed in order to reduce its thickness and to miniaturize it.

Hereafter, a first example of the above-mentioned conventional optical head device is described with reference to FIG. 17 and FIG. 18. On x-y-z coordinates illustrated in the lower left-hand portions of these figures, the directions of axes x, y and z in FIG. 17 correspond to the directions of axes x, y and z in FIG. 18, respectively.

FIG. 17 is a side view of the conventional optical head device. The optical head device comprises a a semiconductor laser 101, the photodetector 190, a collimating lens 102, a holographic optical element 170, an objective lens 103 and an optical disk 105.

A light beam L0 emitted from the semiconductor laser 101 is converged by the collimating lens 102 and enters the objective lens 103 through the holographic optical element 170. The light beam L0 is focused on the optical disk 105 by the objective lens 103. A light beam reflected by the optical disk 105 enters the holographic optical element 170, passing reversely through upper half part of optical path until the holographic optical element 170. One light beam L1 diffracted by the holographic optical element 170 in a first return path is applied to the photodetector 190 and is detected. A servo signal and an information signal are obtained by calculating the output of the photodetector 190.

Configurations and arrangements of the holographic optical element 170 and photodetector 190 are illustrated in FIG. 18. FIG. 18 shows plan views of the holographic optical element 170 and photodetector 190 seen in the negative direction of z-axis in FIG. 17 (i.e. in the direction from the optical disk 105 to the semiconductor laser 101 along the paper face). In FIG. 18, the holographic optical element 170 and the photodetector 190 are illustrated remote at an upper portion and a lower portion, respectively. In an actual positional relation on y-axis, the center of the holographic optical element 170 coincides with the center of the photodetector 190 and thus the holographic optical element 170 must overlap the photodetector 190 when both are observed in the negative direction of z-axis. In FIG. 18, just for the sake of easier elucidation of configuration in plan views, the figure of the holographic optical element 170 is shown shifted in the direction of y-axis by a distance. Moreover, for the same purposes, the figure of the photodetector 190 are shown enlarged in relation to those of the holographic optical element 170. The holographic optical element 170 comprises three areas 170a, 170b and 170c which are different in hologram pattern. Moreover, the detection area of the photodetector 190 is divided into areas S2a, S1b, S1a, S1c, S1b', S1a', S1c' and S2b.

The largest and circular area 170a is designed so that the diffracted light beam of +1st order in the return path from the holographic optical element 170 makes two kinds of spherical waves which have different curvatures from each other. A first kind of spherical wave is focused at a position nearer to the holographic optical element 170 than the face of the photodetector 190 (at an upper position of the paper face of FIG. 19 in the direction of z-axis) and a second kind of spherical wave is focused beyond the face of the photodetector 190 (at an underneath position of the paper surface in the direction of z-axis). The first and second kinds of spherical waves are applied to cross-sections L1a, L1a' representing light beam spots on the photodetector 190, respectively. The term "cross-section" represents a shape or a size of the light beam spot impinging on the surface of the photodetector, and hereafter is simply referred to as a cross-section.

A focus error signal FE is detected by known SSD method (Spot Size Detection method) utilizing the difference of the focusing positions. When output values of the detection areas are represented by respective reference numerals of the detection areas of the photodetector 190, the focus error signal FE is obtained by calculation of equation (1).

$$FE=(S1a-S1b-S1c)-(S1a'-S1b'-S1c') \quad (1)$$

The holographic optical element 170 is designed so that the light beams passing through the areas 170a and 170b of the holographic optical element 170 are applied to the areas S2a and S2b of the photodetector 190, respectively. A tracking error signal TE is detected by a push-pull method. When the output values of the detection areas are represented by respective reference numerals, the tracking error signal TE is given by the following equation (2).

$$TE=S2a-S2b \quad (2)$$

As shown in FIG. 17, the semiconductor laser 101 is arranged adjacent to the photodetector 190 in the above-mentioned conventional configuration.

A second example of the conventional optical head device is elucidated with reference to FIG. 19 and FIG. 20. On x-y-z coordinates illustrated in these figures, the directions of axes x, y and z in FIG. 19 are identical with the directions of axes x, y and z in FIG. 20, respectively.

Referring to FIG. 19, the optical head device comprises a diffraction grating 111, the collimating lens 102, the holographic optical element 170, the objective lens 130 and the optical disk 105.

The optical head device further comprises an LD-PD module (Laser Diode Photo Detector module) 114 having a structure as shown in FIG. 2, which is used in common with the optical head device of the present invention. Referring to FIG. 2, the LD-PD module 114 comprises a silicon substrate 204, a semiconductor laser 101 fixed on the silicon substrate 204, and photodetectors 191, 192 formed on the surface of the silicon substrate 204.

Moreover, an etched mirror 205 is formed on the silicon substrate 204, and a light beam emitted from the semiconductor laser 101 in the direction of y-axis is reflected by the etched mirror 205 and is directed upward in the direction of the z-axis as a light beam L0. Therefore, the light beam L0 is emitted from a virtual emission point 101A in the positive direction of z-axis.

In FIG. 19, the light beam L0 is transmitted through the diffraction grating 111, and a pair of sub-beams (not shown) are made so as to produce the tracking error signal. Subsequently, these light beams are transmitted through the holographic optical element 170 and enter the objective lens 103, and are focused on the optical disk 105.

A light beam reflected by the optical disk 105 enters the holographic optical element 170 by inversely passing a first half optical path. Light beams L1 and L2 of ±1st orders diffracted by the holographic optical element 170 in the return path are applied to the photodetectors 191 and 192 in the LD-PD module 114 and are detected. A servo signal including a focus error signal FE and a tracking error signal TE and an information signal are obtained by calculating the outputs of the photodetectors 191 and 192.

Detailed configurations of the holographic optical element 170 and the LD-PD module 114 are illustrated in FIG. 20. FIG. 20 shows plan views of the holographic optical element 170 and the LD-PD module 114 in the negative direction of z-axis in FIG. 19 (i.e. in the direction from the optical disk 105 to the LD-PD module 114 along the paper face). In FIG. 20, the holographic optical element 170 and the LD-PD module 114 are illustrated remote at an upper portion and a lower portion, respectively. In an actual positional relation on y-axis, the center of the holographic optical element 170 coincides with the center of the LD-PD module 114 and thus the holographic optical element 170 must overlap the LD-PD module 114 when both are observed in the negative direction of z-axis. In FIG. 20, for the sake of rendering the detailed configurations understandable, the figure of the holographic optical element 170 is shifted in the direction of y-axis by a distance. Moreover, for the same purposes, the dimensions of the photodetector 190 are enlarged with respect to those of the LD-PD module 114.

The holographic optical element 170 is a Fresnel zone plate formed by a single area of a hologram pattern shown in FIG. 20. FIG. 20 also represents positional relations among the virtual emission point 101A of the semiconductor laser 101, the photodetectors 191 and 192. A detecting surface of the photodetector 191 is divided into areas S1a, S1b, S1c, S3a and S3b. In corresponding manner, the detecting surface of the photodetector 192 is also divided into areas S2a, S2b, S2c, S4a and S4b.

The diffracted light beams L1 and L2 from the holographic optical element 170 in FIG. 19 are applied to the photodetectors 191 and 192, respectively. Cross-sections of the light beams applied on the surfaces of the photodetectors 191 and 192 are illustrated with circles L1a, L1b, L1c, L2a, L2b and L2c in FIG. 20. The cross-sections L1a and L2a represent light beam spots corresponding to main light beams. The cross-sections L1b, L1c, L2b and L2c represent light beam spots corresponding to the sub-beams.

Since the holographic optical element 170 is the Fresnel zone plate, the diffracted light beam L1 is converged in front of a virtual emission point 101A of the semiconductor laser 101 (in the positive direction of Z-axis, which is perpendicular to the paper surface and upward thereof). Moreover, the diffracted light beam L2 is converged at a position beyond the emission point of the emission point of the semiconductor laser 101 (which is in the negative direction of Z-axis).

The focus error signal FE is detected by a known SSD method (Spot Size Detection method) utilizing the difference of the convergence positions. When the output values from the detection areas of the photodetectors 191 and 192 are represented by the respective reference numerals of the detection areas, the focus error signal FE is obtained by calculation of equation (3).

$$FE=(A1a-S1b-S1c)=(S2a-S2b-S2c) \quad (3)$$

On the other hand, the tracking error signal TE is detected by a known three beam method. When the output values from the detection areas of the photodetectors 191 and 192 are represented by the respective reference numerals of the detection areas, the tracking error signal TE is obtained by calculation of equation (4).

$$TE=(S3a+S4a)-(S3b+S4b) \quad (4)$$

In the first example of the conventional optical head, both the focus error signal FE and tracking error signal TE are obtained by dividing the diffracted light beam of +1st order generated by the holographic optical element 170. In the conventional method, the diffracted light beam of −1st order was not utilized, and thus a utilization efficiency of the light beam was low.

A signal-to-noise ratio (S/N ratio) is lowered by the low light utilization efficiency, in the case that a light intensity of the radiation source is low, in the case that a reflectivity of the information medium is low, or in the case that a light transmission efficiency is low in the optical system, or in the case that a light intensity on the information medium must be limited to a low level in order to read out a signal from an information medium of which information is erasable.

In the case that an offset in a circuit system (offset in operational head amplifier, for example) is changed by a temperature change or a change with the passage of time, there is a problem that a large offset is liable to occur in the servo signal.

Moreover, according to this conventional configuration, the light beams generated by the areas 170b and 170c of the holographic optical element 170 for detecting the tracking error signal TE are not included in the light beams for detecting the focus error signal FE applied to the cross-sections L1a and L1a'. Therefore, a linearity of the focus error signal FE is disturbed and a servo characteristic is deteriorated.

Furthermore, since the tracking error signal TE is detected by only the light beams transmitted from a part of areas of the holographic optical element 170, there is a problem that if flaws or scratches are present on the optical disk, the operation becomes unstable.

In the second example, since the LD-PD module 114 of the configuration as shown in FIG. 2 is used, a focus offset intrinsically exists in the focus error signal FE.

Since the concavity is formed on the silicon substrate 204 to provide the etching mirror 205 and the light beam emitted from the semiconductor laser 101 is reflected by the etching mirror 205, a virtual emission point 101A of the semiconductor laser 101 is shifted backward (in the negative direction of Z axis) with respect to the surface of the silicon substrate 204, namely the surface of the photodetectors 191 and 192.

On the other hand, the diffracted light beams L1 and L2 generated by the holographic optical element 170 are converged at points having the same distances to the positive direction and the negative direction on the Z-axis with respect to the virtual light emission point, respectively. Therefore, the spot sizes of the diffracted light beams L1 and L2 are different from each other on the surfaces of the photodetectors 191 and 192 by the shift of the light emission point, and thus the focus error signal FE which is obtained by equation (1) does not become zero under focused state.

As mentioned above, there is a problem that the optical head device of this configuration has an offset due to a positional difference between the photodetectors 191, 192 and the emission point 101B and results in deteriorations of not only stability of the focus servo control but quality of signals.

Moreover, since the sub-beams are generated on the first half of the optical path to detect the tracking error signal TE, there is a problem that a sufficient intensity of light can not be maintained for a recording and reproducing head of which a high intensity of light is required on the surface of the optical disk.

Furthermore, in the second example, since the tracking error signal TE is detected by the three beam method, a pair of sub-beams is required. Consequently, the light intensity of the main beam on the surface of the optical disk is lowered. Particularly, the optical head for recording and reproducing requires a large intensity of light and thus the optical head of this type is not available.

OBJECT AND SUMMARY OF THE INVENTION

An object of the present invention is to provide an optical head device which provides stable servo characteristic and high efficiency of light utilization.

An optical head device of a first mode of the present invention comprises a radiation source, an imaging optics for converging a light beam from the radiation source to a minute spot on an information medium, a holographic optical element for generating diffracted light beams by diffracting a light beam reflected by the information medium, a photodetector having plural areas for detecting the light beams diffracted by the holographic optical element. A focus error signal is detected by a diffracted light beam of +n-th order (n: natural number) of the diffracted light beams and a tracking error signal is detected by a diffracted light beam of −n-th order (n: natural number) of the diffracted light beams.

An optical head device of a second mode of the present invention comprises a radiation source, an imaging optics for converging a light beam from the radiation source to a minute spot on an information medium, a holographic optical element for generating diffracted light beams by diffracting a light beam reflected by the information medium, a photodetector having plural areas for detecting the light beams diffracted by the holographic optical element. A focus error signal and a tracking error signal are detected by a diffracted light beam of +n-th order (n: natural number) of the diffracted light beams, and an information signal is detected by a diffracted light beam of −n-th order (n: natural number) of the diffracted light beams.

An optical head device of a third mode of the present invention comprises a radiation source, an imaging optics for converging a light beam from the radiation source to a minute spot on an information medium, a holographic optical element for generating diffracted light beams by diffracting a light beam reflected by the information medium, a photodetector having plural areas for detecting the light beams diffracted by the holographic optical element. The radiation source is fixed on the photodetector and is placed at a level different from that including the photodetector. The holographic optical element is divided into plural areas, and a diffracted light beam of +n-th order (n: natural number) generated from one of the plural areas is a spherical wave having the focusing point at a position nearer to the holographic optical element than the surface of the photodetector, and a diffracted light beam of +n-th order (n: natural number) generated from other area of the plural areas is a spherical wave having the focusing point at a position farther from the holographic optical element than the surface of photodetector.

An optical head device of a fourth mode of the present invention comprises a radiation source, an imaging optics for converging a light beam from the radiation source to a minute spot on an information medium, a holographic optical element for generating diffracted light beams by diffracting a light beam reflected by the information medium, a photodetector having plural areas for detecting the light beams diffracted by the holographic optical element. The radiation source is fixed on the photodetector and is placed at a level different from that including the photodetector. A part of the holographic optical element simultaneously generates diffracted light beams of +n-th (n: natural number) order of a spherical wave having the focusing point at a position nearer to the holographic optical element than the surface of the photodetector and a spherical wave having the focusing point farther than the surface of the photodetector from the polarizing holographic beam splitter 181.

An optical head device of a fifth mode of the present invention comprises a radiation source, an imaging optics for converging a light beam from the radiation source to a minute spot on an information medium, a holographic optical element for generating diffracted light beams by diffracting a light beam reflected by the information medium, a photodetector having plural areas for detecting the light beams diffracted by the holographic optical element. The radiation source is fixed on the photodetector and is placed at a level different from that including the photodetector. The holographic optical element is divided into plural areas, a light beam passing through a part of the plural areas is transformed to a wave surface having the focusing point on the surface of the photodetector, and a focus error signal is obtained by a knife-edge method.

Features of the optical head device in accordance with the present invention are described hereafter.

Since the focus error signal is obtained by using all of luminous flux of the diffracted light beam of +n-th order, the focus error signal having a high intensity and a high signal-to-noise ratio (S/N) can be obtained. Moreover, in a similar reason, irregularity does not exist in the luminous flux of the diffracted light beam for detecting the focus error signal, and the focus error signal having a high sensitivity can be obtained.

According to the present invention, since the tracking error signal is obtained by utilizing all of luminous flux of the diffracted light beam of −n-th order, the tracking error signal having a high intensity and a high signal-to-noise ratio (S/N) can be obtained. Moreover, in a similar reason, a stable signal detection is performed even in the case that flaws or scratches exist on the optical disk.

Since detection of the information signal is performed by the photodetector of a single area, the signal detected by the photodetector is amplified by only one head amplifier.

Therefore, cumulation of noise of the head amplifiers is prevented and effective detection of the information signal is realizable.

Moreover, since the photodetector of the information signal is independently arranged, the head amplifier amplifies only the signal which is in a frequency band of the information signal. Therefore, an amplifier of low noise which is capable of amplifying a signal in a wide frequency band of the servo signal is available at lower cost in comparison with the conventional head amplifier.

Since the focus error signal is obtained on the basis of only the diffracted light beam of +n-th order, the problem of difference between the emission point of the LD-PD module and the surface of the photodetector can be solved by adequate design of the holographic optical element. Therefore, the LD-PD module is usable in the state of absence of the focus offset.

Consequently, the size of optical head is miniaturized and weight is reduced, further the stability is improved.

DESCRIPTION OF THE PREFERRED EMBODIMENTS

In x-y-z coordinates illustrated in a lower left portion of each figure, the axis of the same designation indicates the same direction of related figures.

[First embodiment]

The optical head device of the first embodiment is described with reference to figures.

Figure 1:
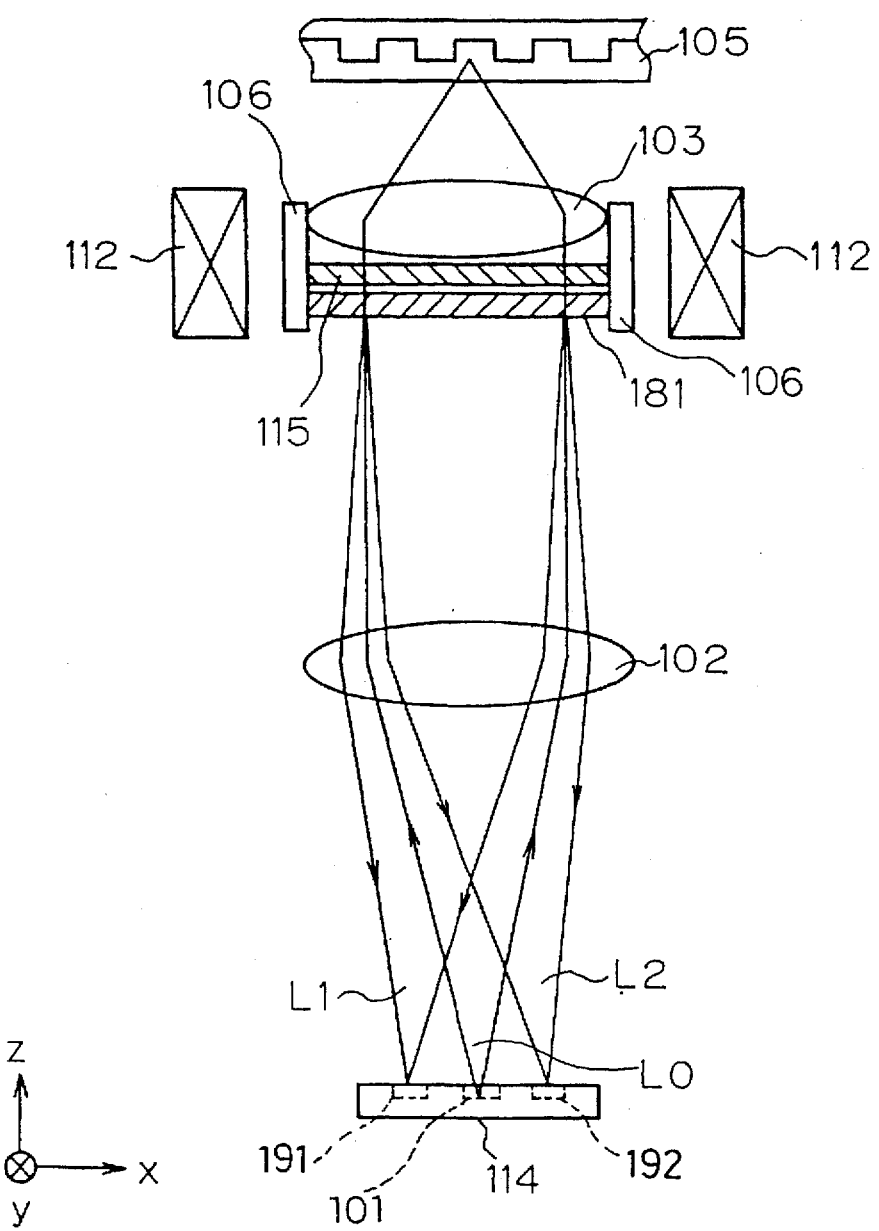
FIG. 1 is a side view of the optical head device of a first embodiment of the present invention.

FIG. 1 is a side view of the optical head device of the first embodiment in accordance with the present invention. Referring to FIG. 1, an LD-PD module (Laser Diode Photo Detector module) 114 is arranged so as to emit a light beam L0 polarized in the direction of x-axis of x-y-z coordinates illustrated in the lower left portion of FIG. 1. A collimating lens 102 collimates the emitted light beam L0. A polarizing holographic beam splitter 181 transmitting a polarized light beam in a specific direction and diffracting a polarized light beam polarized in the direction perpendicular to the specific direction is arranged so as to transmit a polarized light beam, which is polarized in the direction of x-axis. A λ/4 plate 115, an objective lens 103 and the polarizing holographic beam splitter 181 are held by a holding member 106 in a predetermined positional relation. An optical disk 105 is set in a manner that the tangential direction at a position irradiated by the light beam L0 is coincident with the direction of y-axis. The holding member 116 is driven by a driving device 112.

First, the LD-PD module 114 and the polarizing holographic beam splitter 181 are described in detail.

Figure 2:
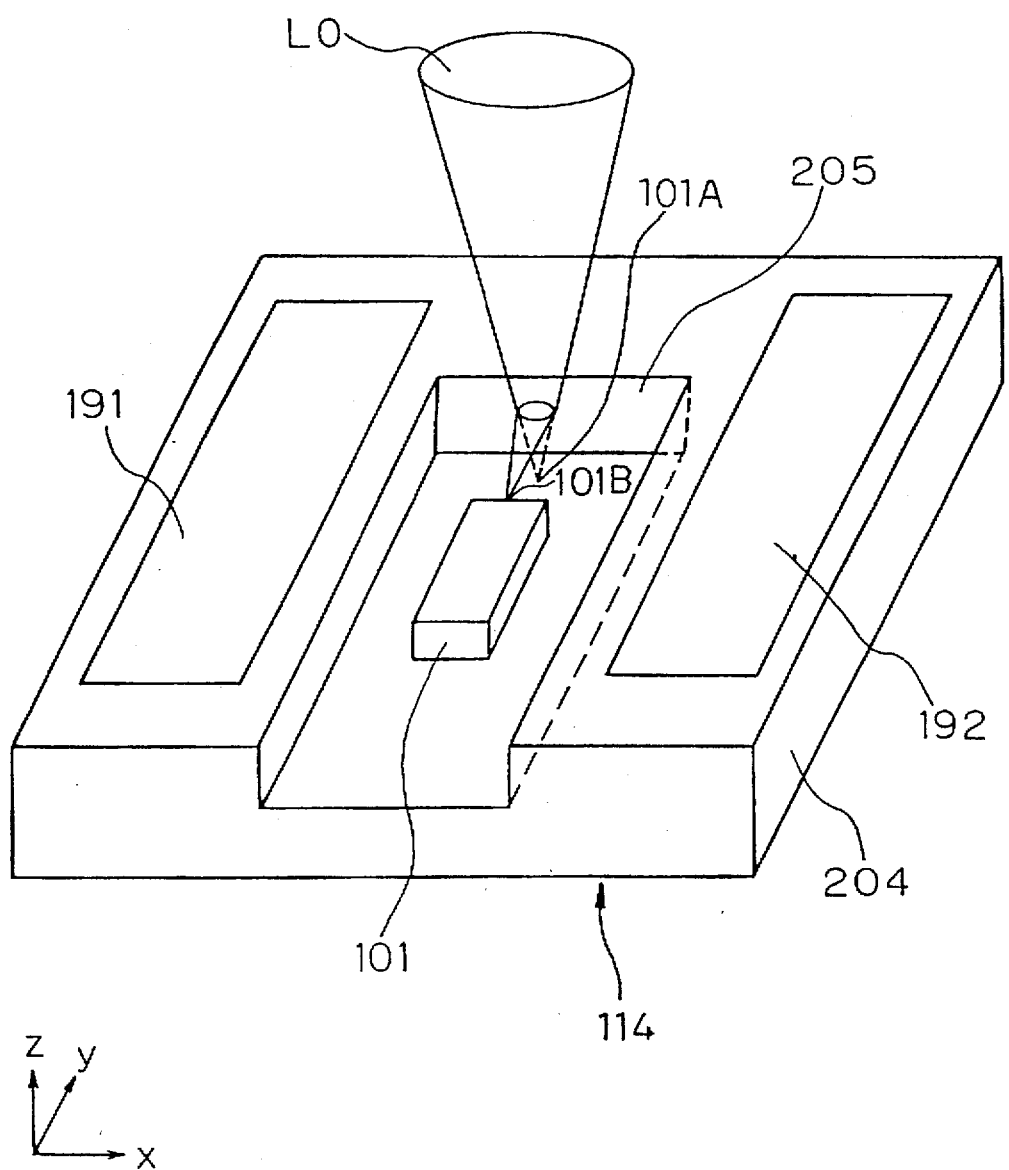
FIG. 2 is a perspective view of an LD-PD module.

FIG. 2 is a perspective view of the LD-PD module 114. Referring to FIG. 2, the LD-PD module comprises a silicon substrate 204, a semiconductor laser 101 mounted on the silicon substrate 204, and photodetectors 191 and 192 formed on the surface of the silicon substrate 204. An etched mirror 205 is formed on a part of the silicon substrate 204, and a light beam emitted from the semiconductor laser 101 to the direction of y-axis is reflected upward of the surface of the silicon substrate 204 as a light beam L0.

In the above-mentioned LD-PD module, the semiconductor laser 101 of a radiation source is fixed directly on the silicon substrate 204 provided with the photodetectors 191 and 192 thereon. Therefore, change of positional relation therebetween due to the influences of a temperature change and vibration can be prevented, and accurate positions are stably maintained. Moreover, the semiconductor laser 101 is mounted on the surface of the silicon substrate 204 by known surface mounting. Therefore, a high positional accuracy is maintained in mounting operation, and the configuration is applicable to mass production.

Figure 3:
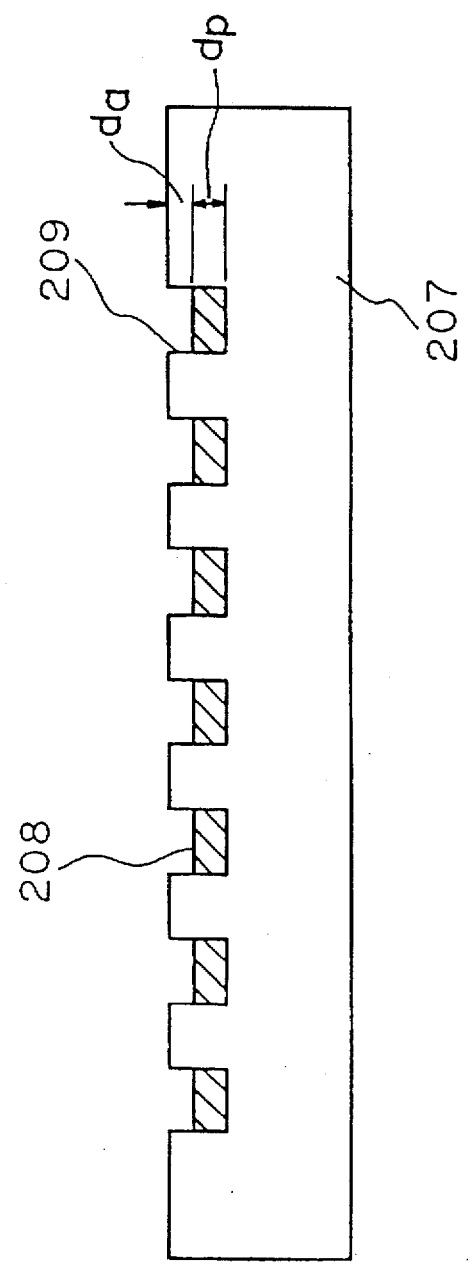
FIG. 3 is a cross-section of a polarizing holographic beam splitter.

FIG. 3 is a cross-sectional side view of the polarizing holographic beam splitter 181. A plurality of grooves 209 of depth $d_p$ are formed by etching on the surface of a lithium niobate substrate 207 of x-plane with a predetermined interval. A proton-exchanged layer 208 is formed in each groove 209.

Operation of the polarizing holographic beam splitter 181 is described hereafter. A part of the light beam applied to the polarizing holographic beam splitter 181 is transmitted through the proton-exchanged layers 208 and the grooves 209. Remaining part of the light beam is transmitted through the lithium niobate substrate 207. Consequently, the phase of the light beam transmitted through the proton-exchanged layers 208 and the grooves 209 is shifted with respect to the phase of the light beam transmitted through the lithium niobate substrate 207.

In the case of incidence of an ordinary ray, a refractive index in the proton-exchanged layer 208 lowers by 0.04. Therefore, the phase of the ordinary ray leads in the proton-exchanged layer 208 and further leads in the groove 209. On the other hand, in the case of incidence of an extraordinary ray, the refractive index increases by 0.145 in the proton-exchanged layer 208, and the phase thereof lags. However, the phase leads in the groove 209, and phase shifts in both the proton-exchanged layer 208 and the groove 209 are countervailed. As mentioned above, a polarizing beam split function that the ordinary ray is diffracted and the extraordinary ray is not diffracted, is realized by suitably selecting the depths of the proton-exchanged layer 208 and the groove 209.

For example, in the case of the incident light of 0.78 μm of wavelength, in order to realize the polarizing beam split function, it is preferable that the depth $d_a$ of the groove 209 is 0.25 μm and the depth $d_p$ of the proton-exchanged layer 208 is 2.22 μm. Incidentally, the groove 209 can be divided into arbitrary areas, and an arbitrary pattern can be formed on the surface of the lithium niobate substrate 207. Consequently, an arbitrary wave surface of a diffracted light is realizable.

Operation of the optical head device configured above is described hereafter. The light beam L0 emitted from the LD-PD module 114 is transformed to a collimated luminous flux by the collimating lens 102. Since the light beam of the collimated luminous flux is a polarized light in the direction of x-axis, the polarizing holographic beam splitter 181 transmits the light without diffraction.

The light beam L0 is transformed to circularly polarized light by the λ/4 plate 115, and is converged on the optical disk 105 by the objective lens 103. Light beam reflected by the optical disk 105 enters again the λ/4 plate 115 by inversely passing through the optical path of the original emitting light, and is transformed to a linearly polarized light beam of the direction of y-axis. The light beam is led to the polarizing holographic beam splitter 181.

A diffracted light beam L1 of +1st order and a diffracted light beam L2 of −1st order in the return path are generated by the polarizing holographic beam splitter 181 and are applied to the photodetectors 191 and 192 on the LD-PD module 114, respectively. The light beams are detected by the photodetectors 191 and 192 divided into plural areas, and a servo signal and an information signal are obtained by calculation of these signals.

Figure 4:
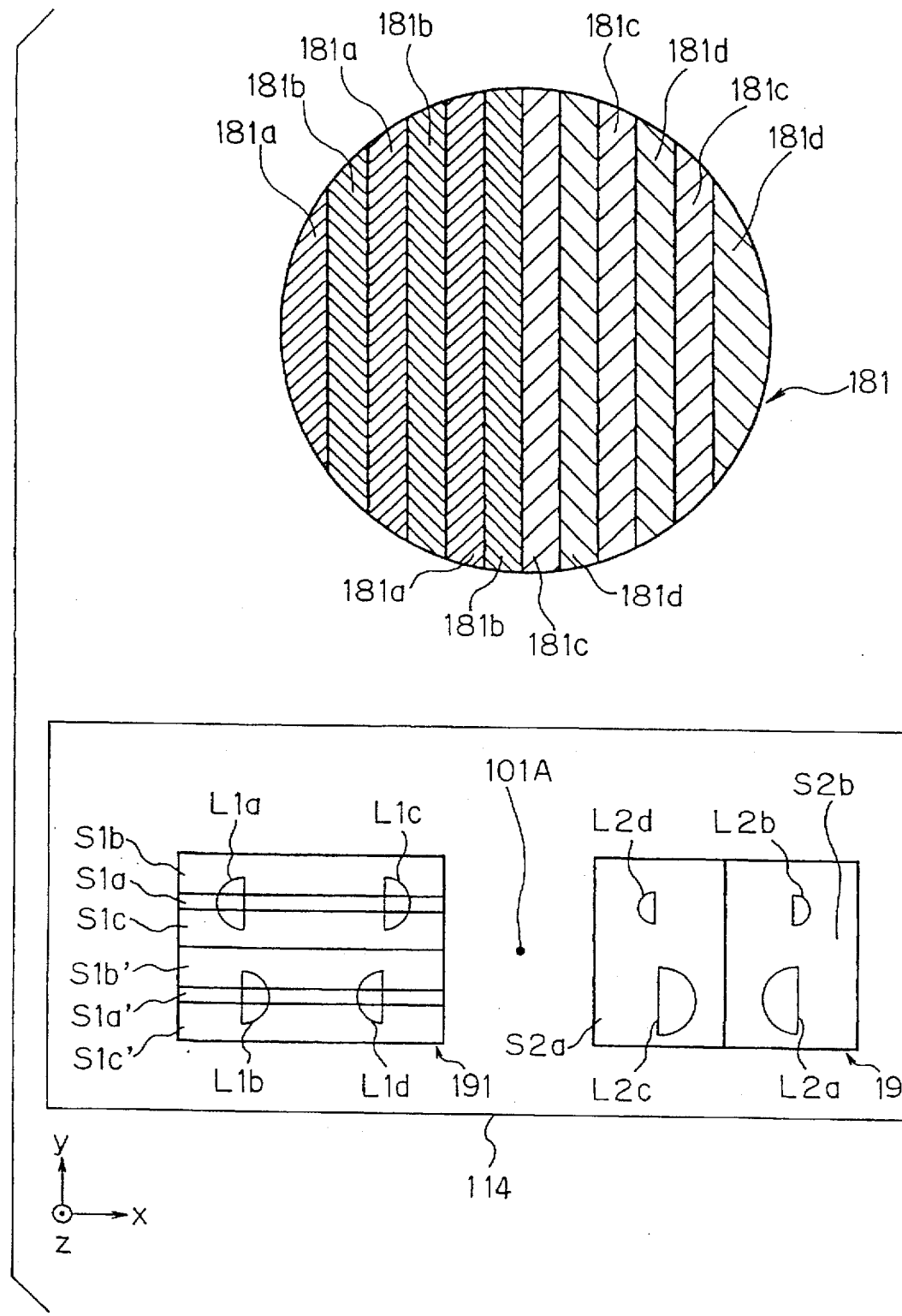
FIG. 4 is a plan view illustrating a positional relation between the polarizing holographic beam splitter and the LD-PD module in the optical head device of the first embodiment.

Relation between the polarizing holographic beam splitter 181 and the LD-PD module 114 is shown in FIG. 4. FIG. 4 is a plan view of the polarizing holographic beam splitter 181 and the LD-PD module 114 in the negative direction of z-axis in FIG. 1 (in the direction from the optical disk 105 to the semiconductor laser 101 along the paper surface). In FIG. 4, the holographic optical element 181 and the LD-PD module 114 are illustrated remote at an upper portion and a lower portion, respectively. In an actual positional relation on y-axis, the center of the polarizing holographic beam splitter 181 coincides with the center of the LD-PD module 114 and thus the polarizing holographic beam splitter 181 must overlap the LD-PD module 114 when both are observed in the negative direction of z-axis. In FIG. 4, for the sake of rendering the detailed configurations understandable, the figure of the holographic optical element 181 is shown shifted in the direction of y-axis by a predetermined distance. Moreover, for the same purpose, the size of the photodetectors 191 and 192 are enlarged in relation with those of the polarizing holographic beam splitter 181. The polarizing holographic beam splitter 181 comprises a pattern as shown in FIG. 4. In FIG. 4, a positional relation between the virtual emission point 101A of the semiconductor laser 101 and the photodetectors 191 and 192 is also illustrated.

The detection surface of the photodetector 191 of the LD-PD module 114 is divided into plural strip areas S1b, S1a, S1c, S1b', S1a∝0, S1c' which are oblong in the direction of x-axis. Moreover, the detection surface of the photodetector 192 is divided into two areas S2a and S2b by a line parallel to y-axis.

As shown in FIG. 4, the polarizing holographic beam splitter 181 is divided into plural strip areas which are oblong in the direction of y-axis. These areas comprise fundamental four patterns, and the same pattern is illustrated by the same hatched part.

A first pattern in an area 181a is designed so that a light beam travelling through the area 181a and arriving the collimating lens 102 is converged at a position further than the surface of the photodetector 191 from the polarizing holographic beam splitter 181 (in the negative region of z-axis), and is applied to the position of a cross-section L1a of the light beam on the photodetector 191. At this time, also a diffracted light beam of −1st order generated from the area 181a simultaneously with the above-mentioned light beam is converged in front of the surface of the photodetector 192 (in the positive direction of z-axis) and is applied to the position of a cross-section L2a of the light beam on the photodetector 192. Namely, the light beams impinge on semicircular areas on the photodetector 191 or 192.

A second pattern in an area 181b is designed so that a light beam travelling through the area 181b and arriving at the collimating lens 102 is converged at a position nearer than the photodetector 191 (in the positive region of z-axis), and is applied to the position of a cross-section L1b of the light beam on the photodetector 191. At this time, a diffracted light beam of −1st order generated from the area 181b is converged at a position farther than the photodetector 192 from the polarizing holographic beam splitter 181 (namely in the negative region of z-axis) and is applied to the position of a cross-section L2b on the photodetector 192.

A third pattern in an area 181c is designed so that a light beam traveling through the area 181c and arriving at the collimating lens 102 is converged at a position farther than the surface of the photodetector 191 from the polarizing holographic beam splitter 181 (namely in the negative region of z-axis), and is applied to the position of a cross-section L1c of the light beam on the photodetector 191. At this time, a diffracted light beam of −1st order generated simultaneously is converged at the position nearer than the photodetector 192 (in the positive region of z-axis) and is applied to the position of a cross-section L2c of the light beam on the photodetector 192.

A fourth pattern in an area 181d is designed so that a light beam traveling through the area 181d and arriving at the collimating lens 102 is converged at a position nearer than the polarizing holographic beam splitter 181 than the photodetector 191 (in the positive region of z-axis), and is applied to the position of a cross-section L1d of the light beam on the photodetector 191. At this time, a diffracted light of −1st order generated from the area 181d is converged at a position farther than the surface of the photodetector 192 from the polarizing holographic beam splitter 181 (in the negative direction of z-axis) and is applied to the position of a cross-section L2d of the light beam on the photodetector 192.

Detection of an information signal, a tracking error signal and a focus error signal is described hereafter.

The information signal is given by a sum of the detected outputs of the photodetectors 191 and 192. Moreover, the information signal is given by only a sum of the detected outputs of the photodetector 191 or only a sum of the detected outputs of the photodetector 192. The latter method is effective in the case that the number of outputs of the LD-PD module 114 is limited.

Subsequently, a detection method of the tracking error signal is described. In the above mentioned configuration, the polarizing holographic beam splitter 181 is designed so that the diffracted light beams of −1st order diffracted by the areas 181a and 181b are applied to the area S2b of the photodetector 192. Moreover, the polarizing holographic beam splitter 181 is also designed so that the diffracted light beam of −1st order diffracted by the areas 181c and 181d are applied to the area S2a of the photodetector 192.

Therefore, the tracking error signal TE can be detected by the known push-pull method. When the output values from the detection areas of the photodetector 192 are represented by the respective reference numerals of the detection areas, the tracking error signal TE is obtained by calculation of equation (5).

$$TE = S2a - S2b \quad (5)$$

Now, method of producing the focus error signal FE is described. The focus error signal FE is detected by the known SSD method (Spot Size Detection method) by detecting sizes of the light beam spot on the photodetector 191. When the output values from the detection areas of the photodetector 191 are represented by the respective reference numerals of the detection areas, the focus error signal FE is obtained by calculation of equation (6).

$$FE = (S1a - S1b - S1c) - (S1a' - S1b' - S1c') \quad (6)$$

Moreover, the focus error signal FE is obtained by calculation of the output values from the areas S1a and S1a' by equation (7).

$$FE = S1a - S1a' \quad (7)$$

The calculation of the equation (7) is effective in the case that the number of outputs of the LD-PD module 114 is limited, or influence of the signals caused by the pit pattern to the focus error signal FE must be reduced.

Hereafter, a detailed operation for detecting the focus error signal FE is described with reference to FIG. 5A, FIG. 5B and FIG. 5C.

Figure 5A:
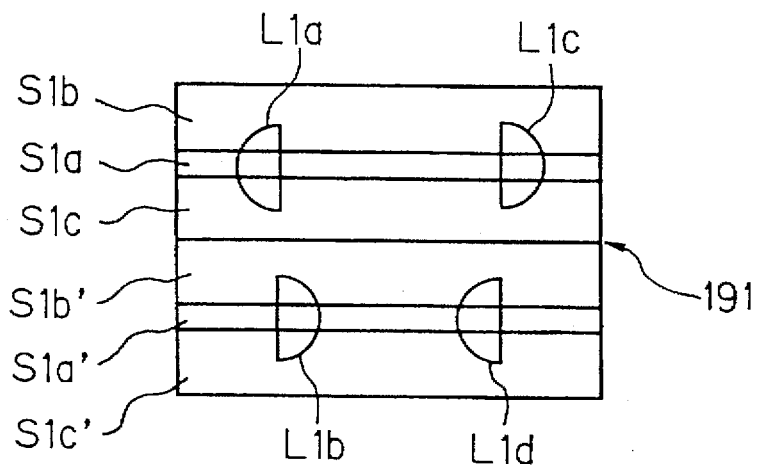
FIG. 5A is a plan view of a photodetector 191 in the state that a light beam is focused on an optical disk in the first embodiment.
Figure 5B:
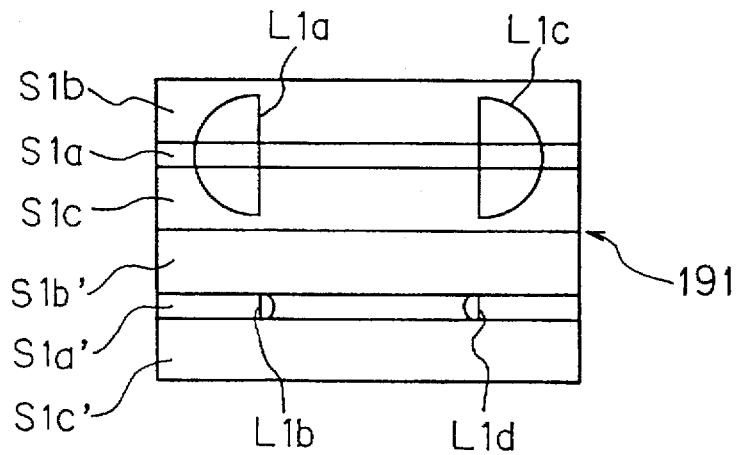
FIG. 5B is a plan view of the photodetector 191 in the state that the light beam is defocused on the optical disk by decreasing the distance between the optical disk and an objective lens in the first embodiment.
Figure 5C:
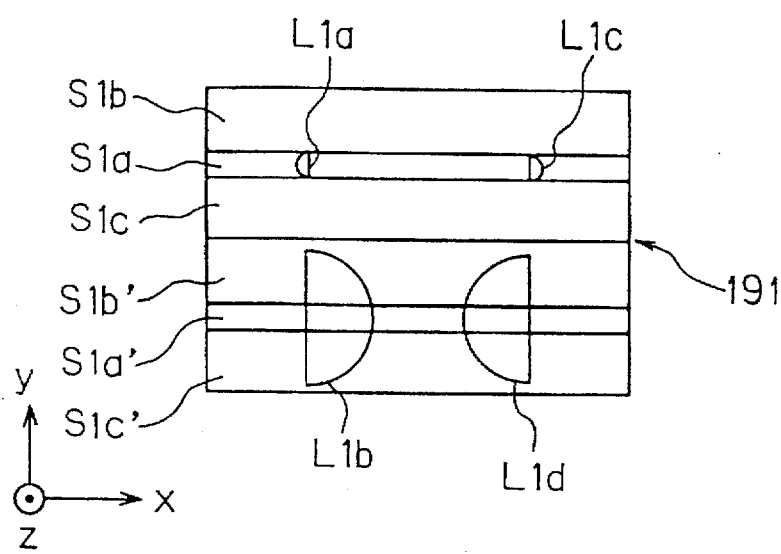
FIG. 5C is a plan view of the photodetector 191 in the state that the light beam is defocused on the optical disk by increasing the distance between the optical disk and the objective lens in the first embodiment.

FIGS. 5A, 5B and 5C are plan views of the photodetector 191.

FIG. 5A is the plan view of the photodetector 191 in the state that the light beam is desirably converged on the optical disk 105 (FIG. 1) (focused state). Semi-circular cross-sections L1a and L1c shows cross-sections of which the light beams to be converged backward of the surface of the photodetector 191 (negative direction of z-axis, under the paper surface) are applied to the surface of the photodetector 191. The area of the cross-section L1a is substantially equal to that of cross-section L1c. Moreover, semicircular cross-sections L1b and L1d show cross-sections of the light beams which are focussed or converged at a position nearer the polarizing holographic beam splitter 181 than the photodetector 191 and are applied to the surface of the photodetector 191. The area of the cross-section L1b is substantially equal to that of the cross-section L1d. Therefore, the focus error signal FE obtained by equation (6) or (7) becomes substantially zero.

Referring to FIG. 1, when the optical disk 105 is brought closer than a designed normal position toward the objective lens 103 and the light beam results in a defocused state, as shown in FIG. 5B, the cross-sections L1a and L1c of the light beams become large on the photodetector 191, because the focus points or converged positions depart from the surface of the photodetector 191. Consequently, the output value of the area S1a decreases and the output values of the areas S1b and S1c increase. On the contrary, the cross-sections L1b and L1d become small on the surface of the photodetector 191 because the focuses or convergence positions are brought closer to the surface of the photodetector 191. Consequently, the output value of the area S1a' increases and the output values of the areas S1b' and S1c' decrease. Therefore, the focus error signal FE given by the equation (6) or (7) becomes a negative value.

FIG. 5C is the plan view of the photodetector 191 in the state that the optical disk 105 is apart from the objective lens 103 than a designed normal position and the light beam results in the defocused state. The cross-sections L1a and L1c become small on the photodetector 191 because the conversion position of the light beam is brought closer to the surface of the photodetector 191 than a designed normal position. Consequently, the output value of the area S1a increases and the output values of the areas S1b and S1c decrease. On the contrary, the cross-sections L1b and L1d become large on the surface of the photodetector 191 because the convergence positions of the light beams depart from the surface of the photodetector 191. Consequently, the output value of the area S1a' increases and the output values of the areas S1b' and S1c' decrease. Therefore, the focus error signal FE given by equation (6) or (7) becomes a positive value.

As mentioned above, the focus error signal is given by the above mentioned methods. In the above-mentioned configuration, the light beam is divided in the direction of x-axis to produce the tracking error signal. However, since the dividing direction coincides with a main diffraction direction (the direction of x-axis) of the polarizing holographic beam splitter 181, influence to the focus error signal can be disregarded.

Moreover, the detection area of the photodetector 191 is divided into plural areas by lines parallel to the x-axis in the embodiment. On the detection surface of the photodetector 192 in FIG. 4, distances in the direction of x-axis between the cross-sections L2d and L2b and between the cross-sections L2c and L2a of the light beams for deriving the tracking error signal are selected sufficiently large. Moreover, lengths of the respective detection areas of the photodetectors 191 and 192 in the direction of x-axis are sufficiently larger than the sizes of the cross-sections of the light beams. Therefore, even if the light beams move in the direction of x-axis by variation of the wave length of the semiconductor laser 101, the light beams are not liable to deviate from the respective detection areas.

Furthermore, according to the configuration, even if the emission point 101B of the semiconductor laser 101 is shifted in the direction of the x-axis, the detection signal are not influenced.

In the manufacturing process of the LD-PD module 114 as shown in FIG. 2, the semiconductor laser 101 must be fixed on the silicon substrate 204. In this fixing process, the semiconductor laser 101 is positioned by observing it from the direction of z-axis. At this time, since the emission point of the semiconductor laser 101 is placed on the surface perpendicular to the y-axis, the emission point can be accurately positioned in the direction of y-axis by observing the surface of the semiconductor laser 101 and positioning the surface to a predetermined position in the direction of y-axis. With regard to the direction of x-axis, the emission point is not always placed at the center of the semiconductor laser chip, and shifted by a cutting process of the chip. Therefore, accurate positioning in the direction of x-axis is impossible by observing the outward shape of the chip. Consequently, a small positional error exists inevitably.

However, in the first embodiment, the deviation of the emission point 101B in the direction of x-axis dose not influence to the servo signal as well as the shift of the cross-sections L1a–L1d, L2a–L2d due to wave length variation as mentioned above, because the length of the photodetector 192 in the direction of x-axis is larger than the cross-sections L1a–L1d, L2a–L2d.

As mentioned above, in the first embodiment, since the focus error signal can be obtained by using all of luminous flux of the diffracted light beam of +1st order and the tracking error signal is made by using all of luminous flux of the diffracted light beam of −1st order, the servo signal having a large intensity of signal and a high signal-to-noise ratio (S/N) is obtainable.

Moreover, since the focus error signal can be obtained by using all of luminous flux of the diffracted light +1st order, the diffracted light beam for detecting the focus error signal is uniform in the direction of y-axis (the direction perpendicular to the dividing line of the photodetector 191). Therefore, the focus error signal is superior in linearity.

Furthermore, since the tracking error signal can be obtained by using all of luminous flux of the diffracted light beam of −1st order, even if scratches exist on the optical disk 105 for example, stable detection of the tracking error signal is realizable.

As mentioned above, the first embodiment of the present invention can solve all of the problems in the first prior art.

Moreover, in the first embodiment, the problem of the focus offset of the LD-PD module 114 in the prior art can be solved.

The problem of the offset may be solved by increasing the diffraction angle of the holographic optical element 170 and by utilizing a method that the main plane of the collimating lens 102 becomes a spherical face in the prior art. However, a pitch of the grating of the holographic optical element 170 which is used in this method becomes several microns (μm) and below, and thus there is difficulty in mass production.

Furthermore, in the polarizing holographic beam splitter 181 which is used in the first embodiment, such a fine pitch of the grating can not be made, and thus the problem can not be solved by this method.

For this reason, in the first embodiment, a polarizing holographic beam splitter 181 is used in order that two wave surfaces which converge at separate points as the diffracted light beams of +1st order are formed independently in the same distances and inverse directions on z-axis from the photodetector 191. Furthermore, the LD-PD module, of which the emission point 101B is at a level different from that of the surface of photodetector 191, in the direction of z-axis is available in the state without the focus offset. Consequently, a stable focus servo is realizable.

Moreover, in the configuration of the first embodiment, apart from the prior art the subbeam for detecting the tracking error signal is not needed and thus is different from the second prior art. Therefore, a sufficient light intensity is available on the surface of the optical disk. As mentioned above, according to the first embodiment of the present invention, the problems of the second prior art are entirely solved.

Incidentally, in the first embodiment, since the LD-PD module 114 can be used as mentioned above, a stable optical system can be inexpensively fabricated.

In general, the optical head utilizing the holographic optical element uses a module in which an LD (laser diode) and a PD (photodetector) are made monolithically in one body. In the module, since a semiconductor laser and a photodetector are closely and rigidly fixed, positional shift due to thermal expansion or vibration does not occur, and stable operation is realizable. On the contrary, a module of which a specified positional relation is adjusted among these elements is difficult to obtain, and a fabrication cost thereof is expensive.

In the LD-PD module 114 of the first embodiment, since the photodetectors 191 and 192 are formed on the same silicon substrate 204, a positional relation between the photodetector 191 and the photodetector 192 can be easily set with a high accuracy such as of submicron order by a fabricating process of an integrated circuit.

Furthermore, the semiconductor laser 101 can be mounted on the silicon substrate 204 from the surface thereof. Namely, the mounting operation can be performed from the direction of one axis. Consequently, for example, a positional error at the time of changing the holding position of a work (e.g. semiconductor laser 101) is prevented, and the semiconductor laser 101 can be mounted with a high accuracy.

In the first embodiment, for example, a problem in the LD-PD module 114 such as the focus offset is solved, and an inexpensive and stable optical system is attainable by using the LD-PD module 114.

Moreover, according to the first embodiment as mentioned above, a positional allowance in the direction of x-axis of the emission point 101B of the semiconductor laser 101 is large, and thereby further inexpensive and stable optical system is attainable.

Moreover, in the first embodiment, since the polarizing holographic beam splitter 181 and the λ/4 plate 115 are used, unnecessary diffraction does not occur in the first half optical path. In the return path, the diffracted light beam for deriving the servo signal or the like is generated. Consequently, a high efficiency in use of light is attainable, and a large amplitude of signal is attained. Furthermore, noise by unnecessary diffracted light beam is not generated, and a very high signal-to-noise ratio is attainable. Particularly, in optical head device for an optical disk of higher density than the compact disk, such a remarkable effect that a servo signal and information signal of further high quality can be made is attained by decreasing the unnecessary diffracted light beam to minimize to zero.

Moreover, since diffraction efficiencies of the light beams of +1st order and −1st order in the return path can be enhanced and a diffraction efficiency of the light beam of zero order (i.e. transmittance) can be lowered, an intensity of a return light beam to the semiconductor laser 101 can be lowered. Consequently, in the case that the semiconductor laser is used for the radiation source, generation of scoop noise by interference between the emitted light and the return light can be prevented.

Furthermore, in the first embodiment, the polarizing holographic beam splitter 181, the λ/4 plate 115 and the objective lens 103 are supported by the holding member 106 with a constant relative position. Consequently, when the objective lens 103 is moved for tracking control, the polarizing holographic beam splitter 181 is also moved together with the objective lens 103, and the light beam reflected from the optical disk 105 does not move on the polarizing holographic beam splitter 181. Therefore, in spite of moving of the objective lens 103, the signals obtained by the photodetectors 191 and 192 are not deteriorated and a stable servo control is realized.

The polarizing holographic beam splitter 181 of the first embodiment is configured divided into plural strip areas divided by lines parallel to y-axis as shown in FIG. 4. In this configuration, since only one kind of grating exists on one position, unnecessary diffracted light beam due to interference between gratings is not generated, and stray light decreases. Furthermore, noise decreases and a high efficiency is realized in use of light.

The pattern of the polarizing holographic beam splitter 181 is designed so as to suppress cross-talk of the tracking error signal to the focus error signal to a minimum. That is, pairs of the areas 181a and 181c for focusing at positions beyond the surface of the photodetector 191 and pairs of the areas 181b and 181d for focusing at positions beforehand of the same surface are alternately arranged by a sufficient number of repetitions. Therefore, influence due to inequality in distribution of the light intensity in the entire area of the polarized hologram beam splitter 181 is reduced in the detected signal of the photodetector 191. That is, the light beam applied to each of the cross-sections L1a, L1b, L1c and L1d is an aggregation of plural light beams arrived from the plural strip areas of the polarizing holographic beam splitter 181. Therefore, even if the intensity distribution in the light beam entered in the polarizing holographic beam splitter 181 is not uniform and is partially irregular, irregularity in the average light intensity among the cross-sections L1a, L1b, L1c and L1d is reduced. Consequently, the intensity of the diffracted light beams of −1st order mixed in the light beams of the cross-sections L1a, L1b, L1c and L1d are substantially identical with each other, and thus the mixed diffracted light beams of −1st order are countervailed by subtraction of equation 6 or 7. Namely, the above mentioned cross talk of the tracking signal decreases.

Though the polarizing holographic beam splitter 181 shown in FIG. 3 is used in the first embodiment, a holographic optical element which is different in diffraction efficiency in a polarization direction is usable for the polarizing holographic beam splitter 181. For example, a holographic optical element disclosed in the Japanese published unexamined patent application Sho 63-314502 is usable. A holographical optical element using liquid crystal is also usable.

Furthermore, the LD-PD module 114 is not limited to the LD-PD module of the configuration shown in FIG. 4, and an LD-PD module in which a semiconductor laser and a photodetector are formed in one body is usable. For example, LD-PD modules shown in FIG. 6 and FIG. 7 are also usable.

Figure 6:
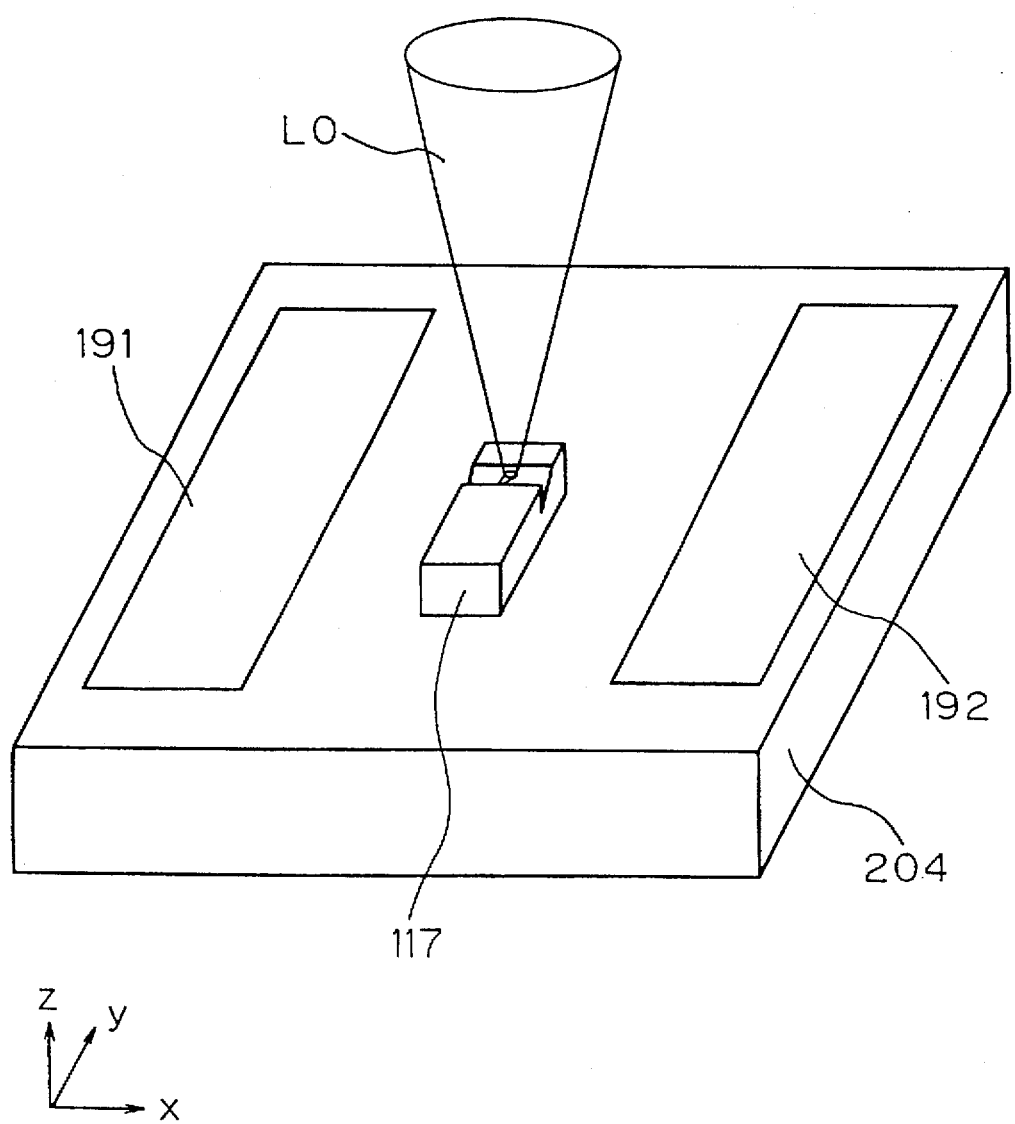
FIG. 6 is a perspective view of an LD-PD module in other example.

The LD-PD module shown in FIG. 6 comprises the silicon substrate 204, the photodetectors 191 and 192 formed on the surface of the silicon substrate 204 at both end portions and a semiconductor laser 117 of a surface emission type mounted on the surface of the silicon substrate 204 at the central portion. The semiconductor laser 117 of the surface emission type emits a laser beam L0 in the direction substantially normal to the surface of the silicon substrate 204 (direction of z-axis in FIG. 6) by reflecting a laser beam emitted in the direction of y-axis by a built-in mirror.

Figure 7:
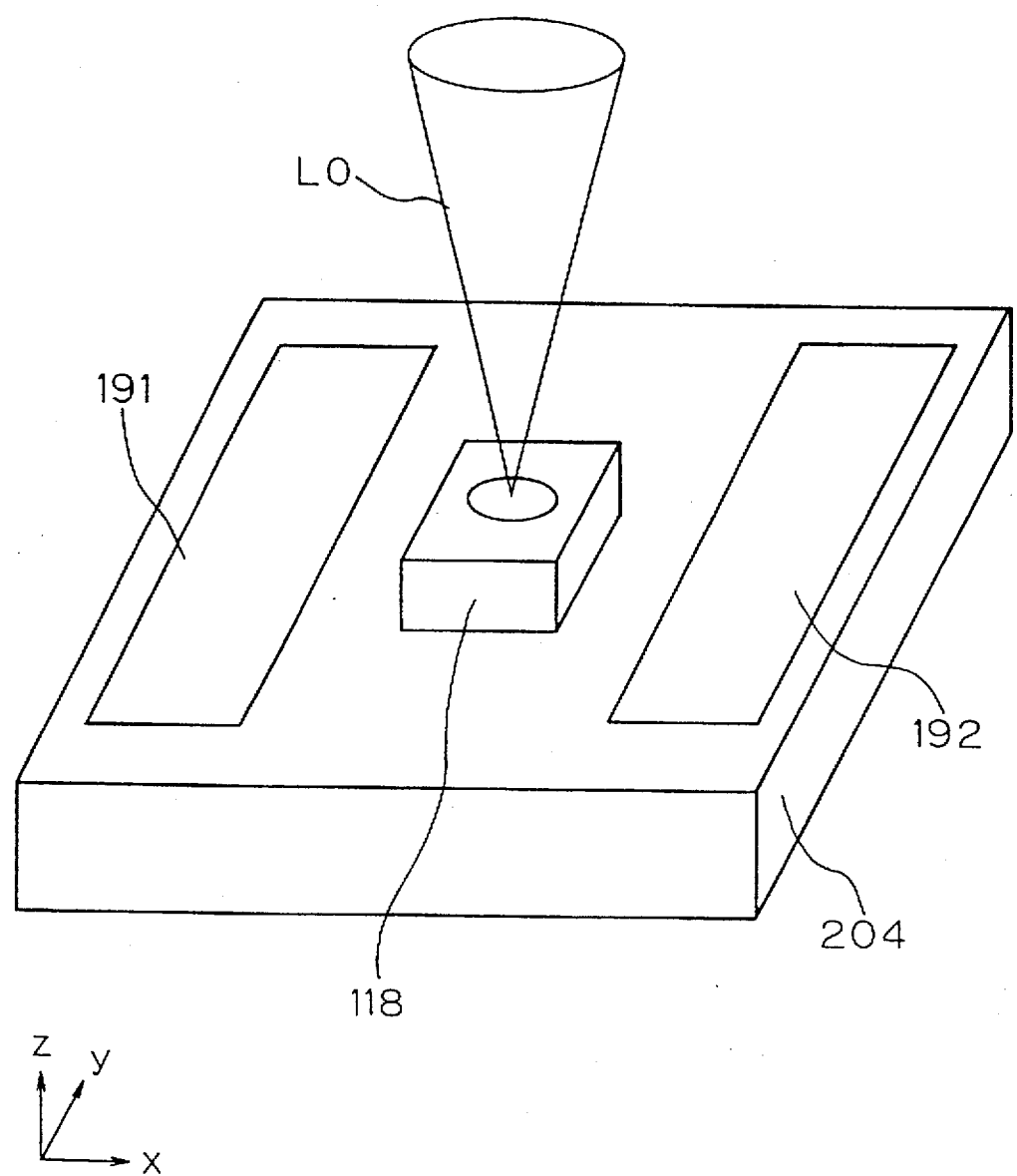
FIG. 7 is a perspective view of an LD-PD module in further example.

The LD-PD module shown in FIG. 7 is different from the LD-PD module as shown in FIG. 6 in a surface emission semiconductor laser 118. The surface emission semiconductor laser 118 emits the laser beam L0 in the direction substantially normal to the surface of the silicon substrate 204.

In this embodiment, the tracking error signal TE, focus error signal FE and information signal are produced on the basis of the diffracted light beams of +1th order and −1th order. The diffracted light beams to detect these signals are not limited to +1st order and −1st order. These signals are also detectable on the basis of diffracted light beams of +n-th order and −n-th order(n: natural number). [Second embodiment]

The optical head device of the second embodiment in accordance with the present invention is described hereafter. The optical head device of the second embodiment is effective, when suppress of cross talk of the tracking error signal to the focus error signal is more necessary in comparison with the optical head device of the first embodiment.

A fundamental configuration of the optical head device of the second embodiment is the same as that of the first embodiment as shown in FIG. 1. A difference of the second embodiment from the first embodiment is to use a polarizing holographic beam splitter 182 having a hologram pattern shown in FIG. 8 as replacement for the polarizing holographic beam splitter 181. Operation of the second embodiment is substantially identical with that of the first embodiment.

Figure 8:
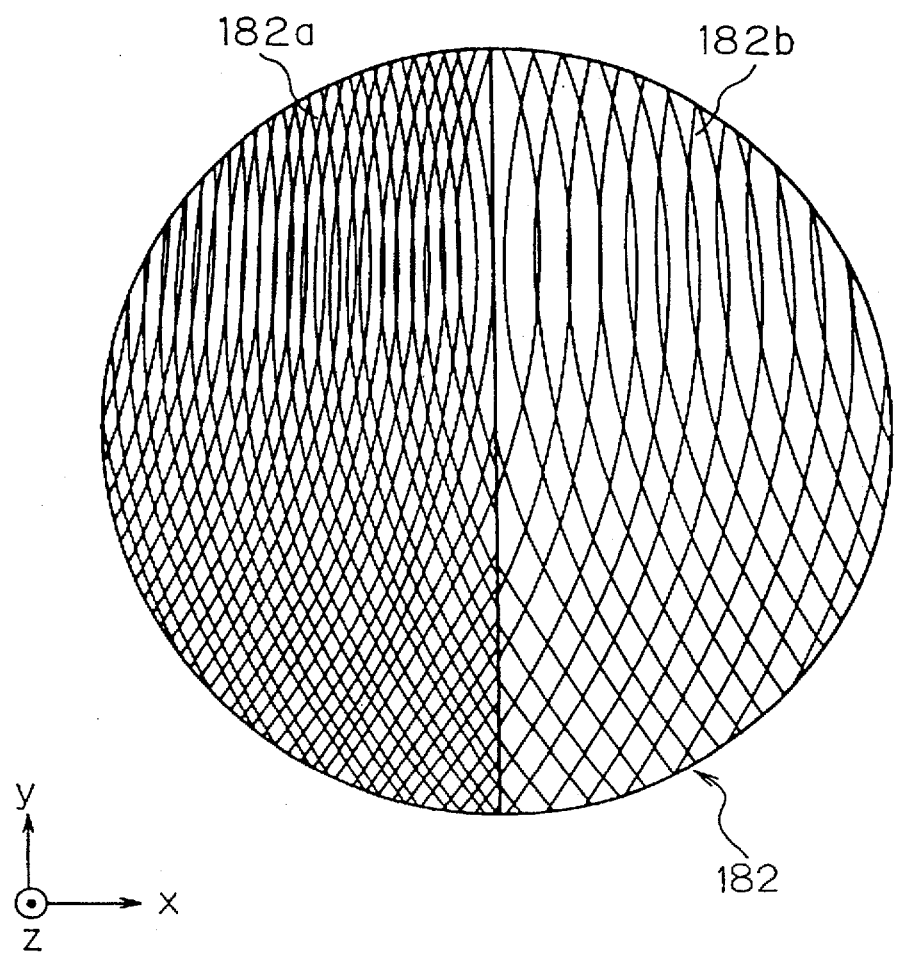
FIG. 8 is a plan view of a polarizing holographic beam splitter of the optical head device of a second embodiment of the present invention.

The polarizing holographic beam splitter 182 comprises two areas 182a and 182b as shown in FIG. 8. The area 182a is designed so that two light beams corresponding to the cross-sections L1a and L2b in FIG. 4 are generated. Moreover, the area 182b is designed so that two light beams corresponding to the cross-sections L1c and L2d in FIG. 4 are generated.

These areas 181a and 182b are fundamentally constituted by overlapping two different Fresnel zone plates. In the optical head device configurated as mentioned above, a diffracted light beam focused beforehand of the surface of the optical detector 191 and a diffracted light beam focused beyond of the same surface are generated from substantially the whole parts of the surface of the polarizing holographic beam splitter 182.

Plural diffracted light beams originated by plural tracks of the optical disk 105 are equally mixed in the diffracted light beams generated by the areas 182a and 182b. However, the output values caused by such mixed diffracted light beams are canceled by subtraction in equation (6).

Consequently, noise caused by cross talk of the tracking error signal or the like is decreased in the attained focus error signal, and a stable focus servo operation is realizable. The above mentioned configuration is effective in the case that suppression of the cross talk of the tracking error signal to the focus error signal is particularly important.

In the second embodiment, though unnecessary diffracted light beam is generated by interference between gratings, the second embodiment provides all features of the first embodiment.

In the second embodiment, as the polarizing holographic beam splitter 182 the polarizing holographic beam splitter shown in FIG. 3 is used. Apart from this, a holographic optical element which is different in diffraction efficiency with respect to the polarization direction is usable for the polarizing holographic beam splitter 182. For example, the holographic optical element disclosed in the Japanese published unexamined patent application sho 63-314502 is usable, and the holographic optical element using liquid crystal is also usable.

Furthermore, the LD-PD module 114 is not limited to the configuration as shown in FIG. 2,. A LD-PD module in which a semiconductor laser and a photodetector are monolithically made in one body is usable, and the LD-PD module shown in FIG. 6 or FIG. 7 for example, is also usable.

[Third embodiment]

In the optical head device of the third embodiment in accordance with the present invention, though a high accuracy is required in the positional adjustment of the semiconductor laser 101 in the direction of y-axis, this embodiment has an advantage that sensitivity in detection of the focus error signal is superior to the optical head device in the first embodiment. Therefore, the third embodiment is effective in the case that the focus servo control must be accurately performed, for example in the case that the objective lens has a small focal depth.

Figure 9:
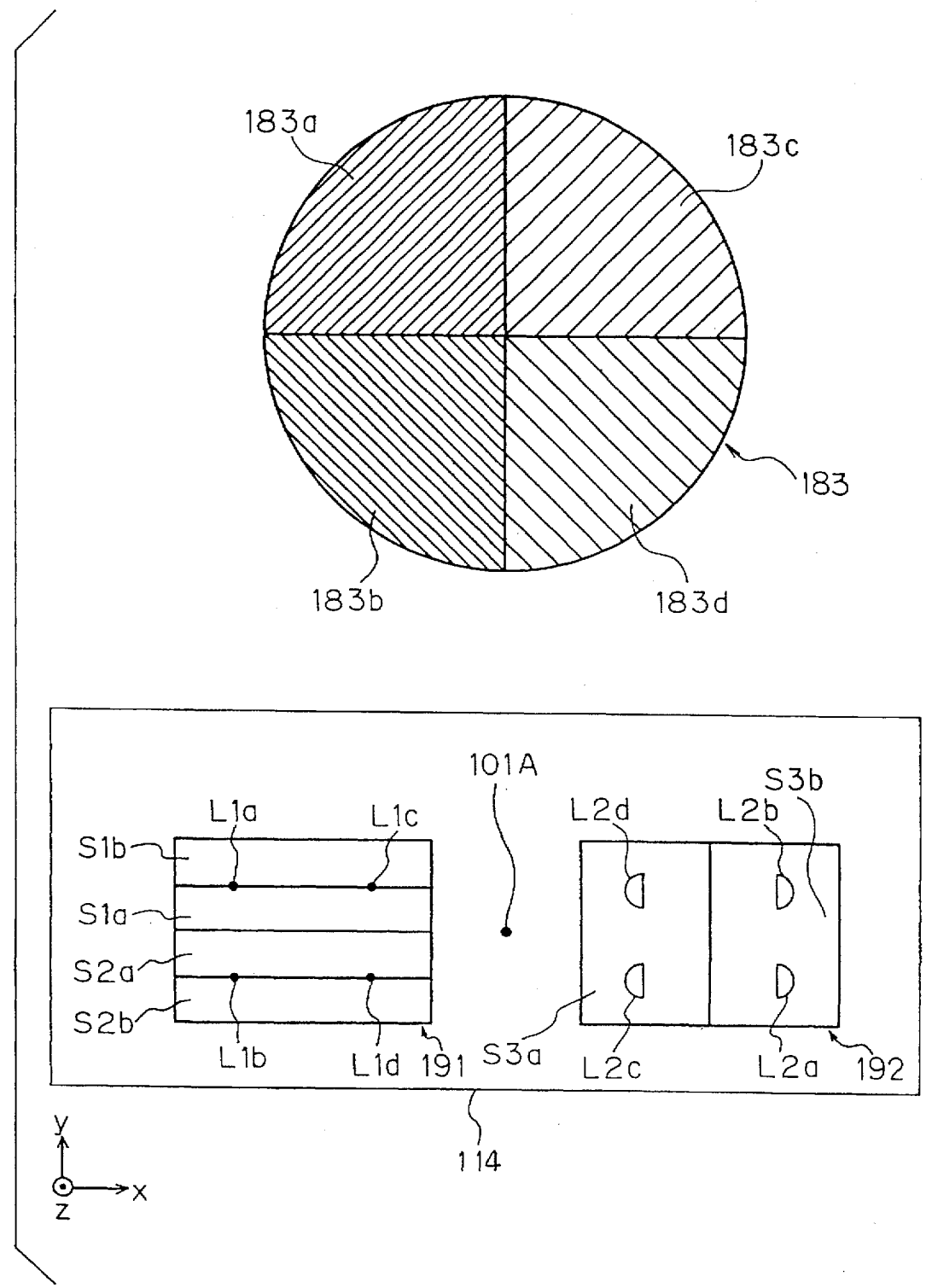
FIG. 9 is a plan view illustrating a positional relation between a polarizing holographic beam splitter and an LD-PD module of a third embodiment of the present embodiment.

Fundamental configuration and operation of the third embodiment are substantially identical with those of the first embodiment as shown in FIG. 1. FIG. 9 is a plan view of the polarizing holographic beam splitter 183 and the LD-PD module 114 of the third embodiment seen in the negative direction of z-axis in FIG. 1 (namely, in the direction from the optical disk 105 to the semiconductor laser 101 along the paper surface of FIG. 1). In FIG. 9, the holographic optical element 183 and the LD-PD module 114 are illustrated remote at an upper portion and a lower portion, respectively. In an actual positional relation on y-axis, the center of the polarizing holographic beam splitter 183 coincides with the center of the LD-PD module 141 and therefore the polarizing holographic beam splitter 183 must overlap the LD-PD module 114 when both are observed in the negative direction of z-axis. However in FIG. 9, for the sake of rendering the detailed configurations understandable, the figure of the polarizing holographic beam splitter 183 is shifted in the direction of y-axis by a predetermined distance. Moreover for the same purposes, the dimensions of the LD-PD module 114 are enlarged with respect to those of the polarizing holographic beam splitter 183. A difference of the third embodiment from the first embodiment is that the polarizing holographic beam splitter 183 having a hologram pattern as shown in FIG. 9 is used as replacement for the polarizing holographic beam splitter 181. Furthermore, the photodetectors 191 and 192 of the LD-PD module 114 are divided into plural areas as shown in FIG. 9.

Referring to FIG. 9, the polarizing holographic beam splitter 183 is divided into four areas 183a, 183b, 183c and 183d by two straight lines passing through the center of the polarizing holographic beam splitter 183 and parallel to the x-axis and y-axis, respectively. The light beams passing through the areas 183a, 183b, 183c and 183d are applied to the positions shown by cross-sections L1a, L1b, L1c and L1d on the photodetector 191, respectively. The polarizing holographic beam splitter 183 is designed so that when the light beam is converged on the optical disk 105, each light beam is converged on the surface of the photodetector 191. Moreover, the polarizing holographic beam splitter 181 is designed so that the diffracted light beams of −1st order represented by the cross-sections L2a and L2b are applied to the area S3b of the photodetector 192 and the diffracted light beams of −1st order represented by the cross-sections L2c and L2d are applied to the area S3a of the photodetector 192.

The information signal can be obtained by a sum of the detected values by the predetermined area of the photodetectors 191 and 192. Moreover, the information signal is given by only summing of the detected values by the areas of the photodetector 191 or 192. The latter is effective in the case that the number of outputs of the LD-PD module 114 is limited.

Subsequently, detection of the tracking error signal in this embodiment is described. The polarizing holographic beam splitter 183 is designed so that the diffracted light beams of −1st order diffracted by the areas 183a and 183b are applied to the area S3b of the photodetector 192 and that the diffracted light beams of −1st order diffracted by the areas 183c and 183d are applied to the area S3a. Therefore, the tracking error signal TE can be detected by the push-pull method.

When the output values of the photodetector 192 are represented by the respective reference numerals of the detection areas S3a and S3b, the tracking error signal TE is obtained by calculation of equation (8).

$$TE = S3a - S3b \qquad (8)$$

Hereafter, detection method of the focus error signal FE in the third embodiment is described. The focus error signal is detected by the known knife-edge method on the photodetector 191. Namely, when the output values of the photodetector 191 are represented by the respective reference numerals of the detection areas, the focus error signal FE is obtained by calculation of equation (9).

$$FE = (S1a + S2a) - (S1b + S2b) \qquad (9)$$

In the case that the focus error signal FE is detected by equation (9), since the area S1a neighbors to the area S2a, both areas S1a and S2a can be used as one area without division.

Furthermore, the focus error signal FE can be obtained by calculations on the basis of the areas S1a and S1b or the areas S2a and S2b by equation (10) or equation (11), respectively.

$$FE = S1a - S1b \qquad (10)$$

$$FE = S2a - S2b \qquad (11)$$

The above-mentioned calculations are effective in the case that the number of outputs of the LD-PD module 114 are limited. Hereafter, detailed operation of the third embodiment is described with reference to FIG. 10A, FIG. 10B and FIG. 10C.

Figure 10A:
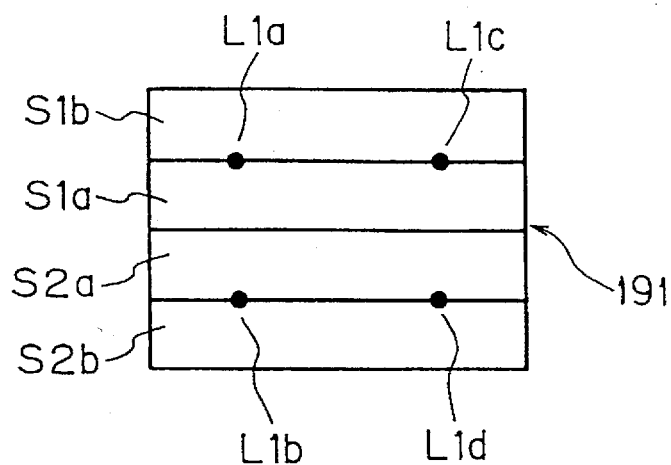
FIG. 10A is a plan view of the photodetector 191 in the state that the light beam is focused on the optical disk in the third embodiment.
Figure 10B:
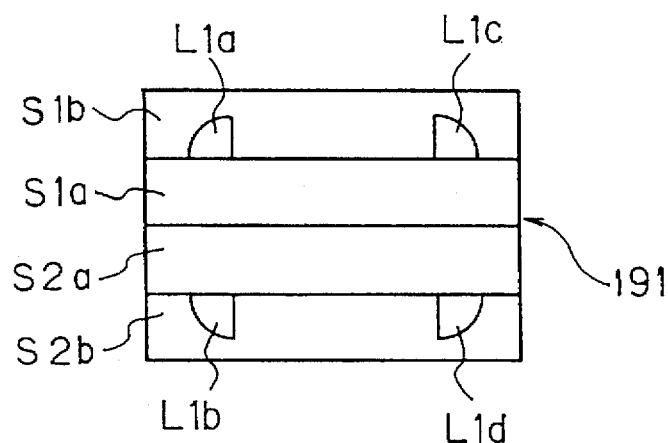
FIG. 10B is a plan view of the photodetector 191 in the state that the light beam is defocused on the optical disk by decreasing the distance between the optical disk and the objective lens in the third embodiment.
Figure 10C:
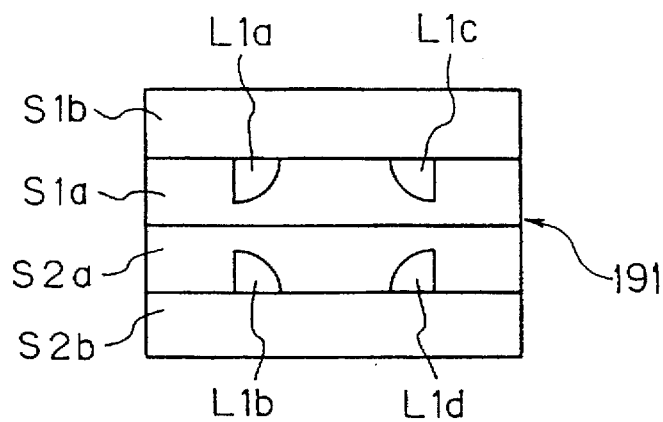
FIG. 10C is a plan view of the photodetector 191 in the state that the light beam is defocused on the optical disk by increasing the distance between the optical disk and the objective lens in the third embodiment.

FIGS. 10A, 10B, 10C are plan views for illustrating distribution of the light beams on the photodetector 191. FIG. 10A is the plan view illustrating distribution of the light beams in the state that the light beam is focused on the optical disk 105 (focused state). The cross-sections L1a and L1c are placed on a boundary between the areas S1a and S1b, and the light beams are focused on the surface of the photodetector 191. The cross-sections L1b and L1d are placed on a boundary between the areas S2a and S2b, and the light beams are focused on the surface of the photodetector 191. Consequently, the focus error signal FE obtained by equation (9), (10) or (11) is substantially zero.

FIG. 10B is the plan view of the photodetector 191 in the state that the optical disk 105 is brought close to the objective lens 103 and the light beam results in defocused state on the optical disk 105. The cross-sections L1a and L1c of the light beams are placed in the area S1b and are not placed in the area S1a. Namely, the light beams are applied to the area S1b and are not applied to the area S1a. Moreover, the cross-sections L1b and L1d are placed in the area S2b and are not placed in the area S2a. Namely, the light beams are applied to the area S2b and are not applied to the area S2a. Therefore, the focus error signal obtained by equation (9), (10) or (11) becomes a negative value.

FIG. 10C is the plan view of the photodetector 191 in the state that the optical disk 105 recedes from the objective lens 103 and the light beam results in defocused state on the optical disk 105. The cross-sections L1a and L1c of the light beams are placed in the area S1a and are not placed in the area S1b. Namely the light beams are applied to the area S1a and are not applied to the area S1b. Moreover, the cross-sections L1b and L1d are placed in the area S2a and are not placed in the area S2b. Namely, the light beams are applied to the area S2a and are not applied to the area S2b. Therefore, the focus error signal FE obtained by equation (9), (10) or (11) becomes a positive value.

As mentioned above, the focus error signal FE can be obtained in the third embodiment. In the third embodiment, the light beam is divided into two beams by lines in the direction of x-axis in order to make the tracking error signal TE as shown in FIG. 9. That is, since a main diffraction direction of the polarizing holographic beam splitter 183 coincides with the direction of division of the light beams, influence given to the focus error signal FE is negligible.

The detection area of the photodetector 191 is divided into plural strip areas parallel to x-axis. Moreover, on the detection surface of the photodetector 192 in FIG. 9, distances in the direction of x-axis between the cross-sections L2d and L2b and between the cross-sections L2c and L2a of the light beams are made sufficiently large. Further, lengths of the detection areas of the photodetectors 191 and 192 in the direction of x-axis are more than the cross-sections of the light beams. Therefore, even if the light beams move in the direction of x-axis due to variation of the wave length of the semiconductor laser 101, the light beams are not liable to deviate from the respective detection areas.

Furthermore, according to the configuration, even if the emission point 101B of the semiconductor laser 101 is shifted in the direction of the x-axis, the detection signal is not influenced.

As described in detail in the description of the first embodiment, in manufacturing process of the LD-PD module 114, the semiconductor laser 101 must be fixed on the silicon substrate 204. In this fixing process, the semiconductor laser 101 can be accurately positioned by observing the outward shape in the direction of y-axis. However, accurate positioning by observing the outward shape of the chip of the semiconductor laser 101 in the direction of x-axis is impossible. Consequently, a small positional error exists inevitably.

In the third embodiment, the deviation of the emission point in the direction of x-axis dose not influence the servo signal as well as the wave length variation as mentioned above, because the length of the photodetector 192 in the direction of x-axis is larger than the sizes of the cross-sections L2a, L2b, L2c, L2d.

As mentioned above, in the third embodiment, since the focus error signal FE can be obtained by using all of luminous flux of the diffracted light beams of +1st order and the tracking error signal TE can be obtained by using all of luminous flux of the diffracted light beams of −1st order, the servo signal having a large intensity and a high signal-to-noise ratio (S/N) is obtainable.

Moreover, since the tracking error signal TE can be obtained by using all of luminous flux of the diffracted light beam of −1st order, even if scratches exist on the optical disk 105, stable detection of the signal is realizable. As mentioned above, according to the third embodiment, all problems in the first example of the prior art are solved.

Moreover, in the third embodiment, the problem of the focus offset of the LD-PD module 114 can be solved.

The problem of the offset may be solved by increasing the diffraction angle of the holographic optical element 170 and by utilizing a method that the main plane of the collimating lens 102 becomes a spherical face in the prior art.

However, a pitch of the grating of the holographic optical element 170 which is used in this method becomes several microns (μm) and below, and thus there is some limitation in mass production.

Furthermore, in the polarizing holographic beam splitter 183 which is used in the third embodiment, such a fine pitch of the grating can not be made, and thus the problem can not be solved by this method.

For this reason, in the third embodiment, the polarizing holographic beam splitter 183 forming plural wave surfaces which are focused on the photodetector 191 as the diffracted light beams of +1st order is used, and thereby the LD-PD module of which the emission point thereof is different from the surface of photodetector is available in the state without the focus offset. Consequently, a stable focus servo is realizable.

Moreover, in the configuration of the third embodiment, the subbeam for detecting the tracking error signal TE is not needed and thus is different from the second prior art. Therefore, a sufficient light intensity is maintained on the surface of the optical disk. As mentioned above, according to the third embodiment of the present invention, the problems of the second prior art are entirely solved.

Incidentally, in the third embodiment, since the LD-PD module 114 can be used as mentioned above, a stable optical system can be inexpensively fabricated.

In general, the optical head utilizing the holographic optical element uses a module in which an LD (laser diode) and a PD (photodetector) are made in one body. In the module, since a semiconductor laser and a photodetector are closely and rigidly fixed, a positional shift due to thermal expansion or vibration does not occur, and stable operation is realizable. On the contrary, a module of which a specified positional relation is adjusted is difficult to obtain in these elements, and a fabrication cost thereof is expensive.

In the LD-PD module 114, since the photodetectors 191 and 192 are formed on the same silicon substrate 204, a relative position between the photodetector 191 and the photodetector 192 can be easily set with such a high accuracy such as a submicron order by a fabricating process of an integrated circuit.

Furthermore, the semiconductor laser 101 can be mounted on the silicon substrate 204 from the surface thereof.

Namely, the mounting operation can be performed from the direction of one axis. Consequently, for example, a positional error in change of holding position of a work (semiconductor laser 101) is prevented, and the semiconductor laser 101 can be mounted with a high accuracy.

In the third embodiment, a problem in the LD-PD module 114 such as the focus offset is solved, and an inexpensive and stable optical system is attainable by using the LD-PD module 114. Moreover, according to the third embodiment, as mentioned above, a positional allowance in the direction of x-axis of the emission point of the semiconductor laser 101 increases, and thereby further inexpensive and stable optical system is attainable.

Moreover, in the third embodiment, since the polarizing holographic beam splitter 183 and the λ/4 plate 115 are used by combining, unnecessary diffraction does not occur in the first half optical path. In the return path, the diffracted light beams for deriving the servo signal or the like are generated. Consequently, a high efficiency in use of light is attainable, and a signal having a large amplitude is attained. Furthermore, noise caused by unnecessary diffracted light beam is not generated, and a very high signal-to-noise ratio is attainable. Particularly, in the optical head device for a high density optical disk more than the compact disk, a remarkable effect of which further high quality servo signal or an information signal can be obtained is attained by decreasing the unnecessary diffracted light beam and making it close to zero.

Moreover, in the third embodiment, since diffraction efficiencies of +1st order and −1st order in the return path can be enhanced and a diffraction efficiency of zero order (i.e., transmittance) can be lowered, an intensity of a return light beam to the semiconductor laser 101 can be lowered. Consequently, in the case that the semiconductor laser is used for the radiation source, generation of noise by the return light beam can be prevented.

Furthermore, in the third embodiment, the polarizing holographic beam splitter 183, the λ/4 plate 115 and the objective lens 103 are supported by the holding member 106 with a constant positional relation. Consequently, when the objective lens 103 is moved for tracking control, the polarizing holographic beam splitter 183 is also moved together with the objective lens 103, but the light beam reflected from the optical disk 105 does not move on the polarizing holographic beam splitter 183. Therefore, in spite of moving of the objective lens 103, the signals obtained by the photodetectors 191 and 192 are not deteriorated and a stable servo control is realized.

In the polarizing holographic beam splitter 183 of the third embodiment, since only one kind of grating is formed at a position, unnecessary diffracted light beam is not generated by interference between gratings, and stray light decreases. Furthermore, noise decreases and a high efficiency is realized in use of the light.

Though the polarizing holographic beam splitter 183 in the third embodiment can be formed by the polarizing holographic beam splitter as shown in FIG. 3, a holographic optical element which is different in diffraction efficiency in the polarization direction is usable for the polarizing holographic beam splitter 183. For example, a holographic optical element disclosed in the Japanese published unexamined patent application Sho 63-314502 is also usable. A holographic optical element using liquid crystal is also usable.

Furthermore, the LD-PD module 114 is not limited to the LD-PD module of the configuration as shown in FIG. 4, and an LD-PD module in which a semiconductor laser and photodetectors are formed in one body is also usable. For example, the LD-PD modules shown in FIG. 6 and FIG. 7 are also usable.

In this embodiment, the tracking error signal TE, focus error signal FE and information signal are obtained on the basis of the diffracted light beams of +1th order and −1th order. The diffracted light beams to detect these signals are not limited to +1st order and −1st order. These signals are also detectable on the basis of diffracted light beams of +n-th order and −n-th order(n: natural number).

[Fourth embodiment]

Figure 11:
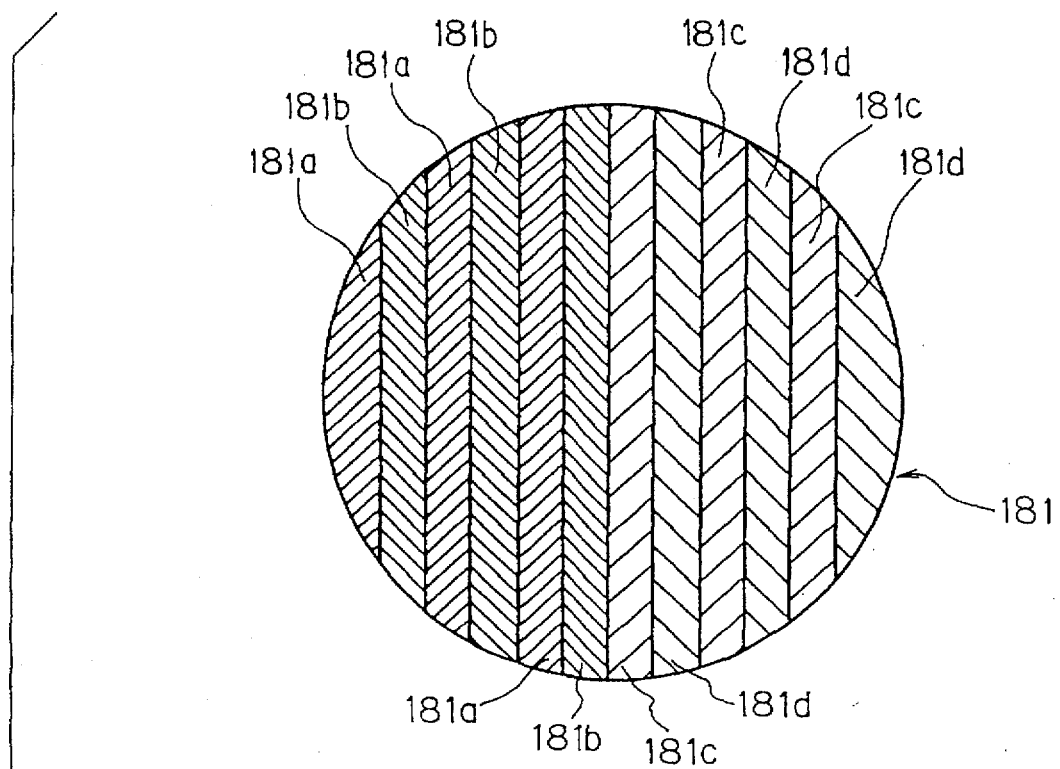
FIG. 11 is a plan view illustrating a positional relation between the polarizing holographic beam splitter and the LD-PD module in the optical head device of a fourth embodiment of the present invention.
Figure 11:
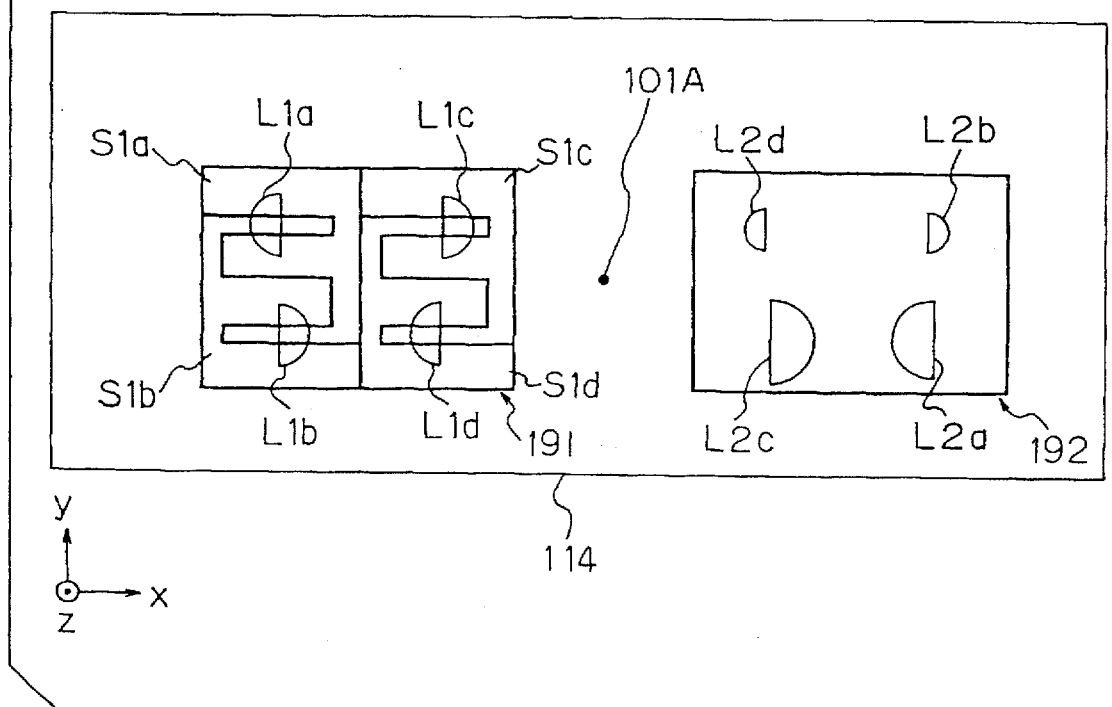

The optical head device of the fourth embodiment of the present invention is described with reference to FIG. 11. In the first, second and third embodiments described above, the information signal is detected on the basis of the sum of the detected values by the plural areas of the photodetectors 191 and 192. Apart from the foregoing embodiments, in the fourth embodiment the information signal is obtained on the basis of the detected value of one area of the photodetector 192. Therefore, only one head amplifier is used for amplifying the information signal. The optical head device of the fourth embodiment is effective in the case that noise in the head amplifier becomes a problem and an expensive head amplifier having a wide frequency band width can not be used due to a limitation of a fabrication cost.

Fundamental configuration and operation of the third embodiment are substantially identical with those of the first embodiment as shown in FIG. 1. FIG. 11 is a plan view of the polarizing holographic beam splitter 181 and the LD-PD module 114 of the third embodiment in the negative direction of z-axis in FIG. 1 (in the direction from the optical disk 105 to the semiconductor laser 101 along the paper surface). In FIG. 11, the holographic optical element 181 and the LD-PD module 114 are illustrated remote at an upper portion and a lower portion, respectively. In an actual positional relation on y-axis, the center of the polarizing holographic beam splitter 181 coincides with the center of the LD-PD module 114 and thus the polarizing holographic beam splitter 181 must overlap the LD-PD module 114 when both are observed in the negative direction of z-axis. However in FIG. 11, for the sake of rendering the detailed configurations understandable, the figure of the polarizing holographic beam splitter 181 is shifted in the direction of y-axis by a predetermined distance. Moreover for the same purposes, the dimensions of the LD-PD module 114 are enlarged with respect to those of the polarizing holographic beam splitter 181. A difference of the third embodiment from the first embodiment is that the photodetector 191 and 192 of the LD-PD module 114 are divided into plural areas as shown in FIG. 11. The detection area of the photodetector 191 is divided into comb-shaped areas S1$a$, S1$b$, S1$c$ and S1$d$. The comb-shaped areas S1$a$ and S1$c$ are engaged with the comb-shaped areas S1$b$ and S1$d$, respectively.

First, a relation between the polarizing holographic beam splitter 181 and the LD-PD module 114 is described with reference to FIG. 11. In FIG. 11, the pattern of the polarizing holographic beam splitter 181 is illustrated, and the positional relation between the semiconductor laser 101 and the photodetectors 191 and 192 in the LD-PD module is also illustrated. The polarizing holographic beam splitter 181 is identical with the polarizing holographic beam splitter used in the first embodiment.

The tracking error signal TE is detected by the known push-pull method. By representing the output values from the detection areas of the photodetector 191 by the respective reference numerals of the detection areas, the tracking error signal TE is obtained by calculation of equation (12).

$$TE=(S1a+S1b)-(S1c+S1d) \qquad (12)$$

The focus error signal FE is detected by the SSD method. By representing the output values from the detection areas of the photodetector 191 are represented by the respective reference numerals of the detection areas, the focus error signal FE is obtained by calculation of equation (13).

$$FE=(S1a+S1c)-(S1b+S1d) \qquad (13)$$

A feature of the fourth embodiment is to detect the information signal on the basis of the output of the photodetector 192 of a single area. Therefore, the output of the photodetector 192 is amplified by one head amplifier. Therefore, undesirable accumulation of noise in amplification is prevented and the information signal can be accurately detected. The undesirable accumulation of noise is described below. In the case that the detected signals from the plural detection areas are amplified by plural head amplifiers and that plural amplified signals are added to one output signal, the noise in each head amplifier is accumulated in the output signal and a signal-to-noise ratio is deteriorated. Since the photodetector 192 of the information signal is independently provided, the head amplifier amplifies only a signal in the frequency band of the information signal. Therefore, an inexpensive amplifier of a low noise can be used in comparison with a head amplifier which is capable of amplifying a servo signal in a wide servo frequency band.

The optical head device of the fourth embodiment also comprises the features of that of the first embodiment.

In the fourth embodiment, the polarizing holographic beam splitter as shown in FIG. 3 is used for the polarizing holographic beam splitter 181. A holographic optical element which is different in diffraction efficiency with respect to the polarization direction is usable for the polarizing holographic beam splitter 181. For example, the holographic optical element disclosed in the Japanese published unexamined patent application sho 63-314502 is usable, and the holographic optical element using liquid crystal is also usable.

Furthermore, the LD-PD module 114 is not limited to the configuration as shown in FIG. 2,. An LD-PD module in which a semiconductor laser and photodetectors are made monolithically in one body is usable, and the LD-PD module as shown in FIG. 6 or FIG. 7 for example, is also usable.

Moreover, the polarizing holographic beam splitter 182 in the second embodiment is usable as replacement for the polarizing holographic beam splitter 181.

[Fifth embodiment]

Figure 12:
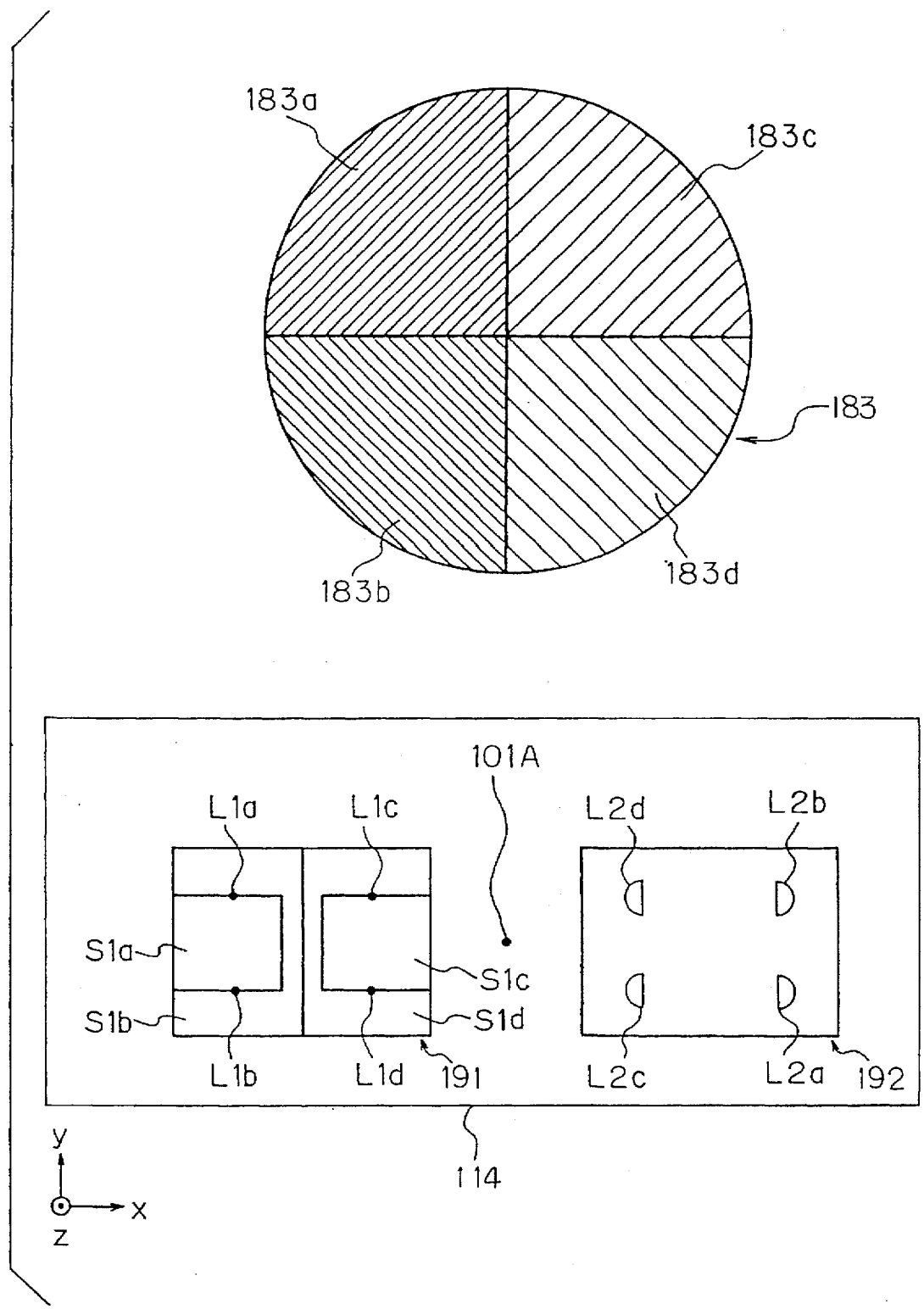
FIG. 12 is a plan view illustrating a positional relation between the polarizing holographic beam splitter and the LD-PD module in the optical head device of a fifth embodiment of the present invention.

In the optical head device of the fifth embodiment as shown in FIG. 12, the information signal is obtained on the basis of the detected value of the photodetector 192 which consists of undivided one area. Therefore, only one head amplifier is used for amplifying the information signal. The optical head device of the fifth embodiment is effective in the case that noise in the head amplifier becomes a problem and an expensive head amplifier having a wide frequency band width can not be used due to a limitation of a fabrication cost.

In the optical head device of the fifth embodiment, though a fairly accurate adjustment of optical elements in the direction of y-axis is required in comparison with the optical head device of the fourth embodiment, a high sensitivity is attained in detection of the focus error signal FE, and is effective in the case that the focus servo operation must be accurately performed, for example, in the case that the objective lens 103 has a thin focal depth.

Fundamental configuration and operation of the fifth embodiment are substantially identical with those of the third embodiment. FIG. 12 is a plan view of the polarizing holographic beam splitter 183 and the LD-PD module 114 of the fifth embodiment in the negative direction of z-axis in FIG. 1 (in the direction from the optical disk 105 to the semiconductor laser 101 along the paper surface). In FIG. 12, the holographic optical element 183 and the LD-PD module 114 are illustrated remote at an upper portion and a lower portion, respectively. In an actual positional relation on y-axis, the center of the polarizing holographic beam splitter 183 coincides with the center of the LD-PD module 141 and therefore, the polarizing holographic beam splitter 183 must overlap the LD-PD module 114 when both are observed in the negative direction of z-axis. However in FIG. 12, for the sake of rendering the detailed configurations understandable, the figure of the polarizing holographic beam splitter 183 is shifted in the direction of y-axis by a predetermined distance. Moreover for the same purposes, the dimensions of the LD-PD module 114 are enlarged with respect to those of the polarizing holographic beam splitter 183. Difference of the fifth embodiment from the third embodiment is that the polarizing holographic beam splitter 183 having a hologram pattern as shown in FIG. 12 is used as replacement for the polarizing holographic beam splitter 181. Furthermore, the photodetectors 191 and 192 of the LD-PD module 114 are divided into plural areas as shown in FIG. 12. The detection area of the photodetector 191 is divided into a rectangular area S1a, a U-shaped area S1b surrounding the area S1a, a rectangular area S1c and a U-shaped area S1d surrounding the area S1c. The detection area of the photodetector 192 is not divided.

First, a relation between the polarizing holographic beam splitter 183 and the LD-PD module 114 is described with reference to FIG. 12. In FIG. 12, the pattern of the polarizing holographic beam splitter 183 is illustrated. Moreover, the positional relation among the emission point of the semiconductor laser 101 and the photodetectors 191 and 192 are illustrated. The polarizing holographic beam splitter 183 is identical with that in the third embodiment.

The tracking error signal TE is detected by the push-pull method in the fifth embodiment. By representing the output values from the detection areas of the photodetector 191 are represented by the respective reference numerals of the detection areas, the tracking error signal TE is obtained by calculation of equation (14).

$$TE=(S1a+S1b)-(S1c+S1d) \qquad (14)$$

The focus error signal FE is detected by the known knife-edge method. By representing the output values of the detection areas of the photodetector 191 are represented by the respective reference numeral of the detected areas, the focus error signal FE is obtained by calculation of equation (15).

$$FE=(S1a+S1c)-(S1b+S1d) \qquad (15)$$

A feature of the fifth embodiment is to detect the information signal on the basis of the output of the photodetector 192 of a single area. Consequently, the output of the photodetector 192 is amplified by one head amplifier, and thus the accumulation of noise in amplification is prevented. The information signal can be accurately detected. Moreover, since the photodetector 192 detects only the information signal, the head amplifier amplifies only the signal in the frequency band of the information signal. Therefore, an inexpensive head amplifier of a low noise can be used in comparison with a head amplifier which is capable of amplifying a servo signal in a wide servo frequency band.

The optical head device of the fifth embodiment comprises the features of the optical head device of the third embodiment. In the fifth embodiment, the polarizing holographic beam splitter 183 is formed by the polarizing holographic beam splitter as shown in FIG. 3. A holographic optical element of which the diffraction efficiency is different in the polarization direction is usable for the polarizing holographic beam splitter 183.

For example, the holographic optical element disclosed in the Japanese published unexamined patent application Sho 63-314502 is usable. Moreover, the holographic optical element using liquid crystal is also usable. Furthermore, as the LD-PD module 114, the one shown in FIG. 2 is used, but it is not limited thereto. As the LD-PD module, one in which the semiconductor laser and the photodetectors are configurated in one body is usable, and the LD-PD module shown in FIG. 6 or FIG. 7 is usable, for example.

[Sixth embodiment]

Figure 13:
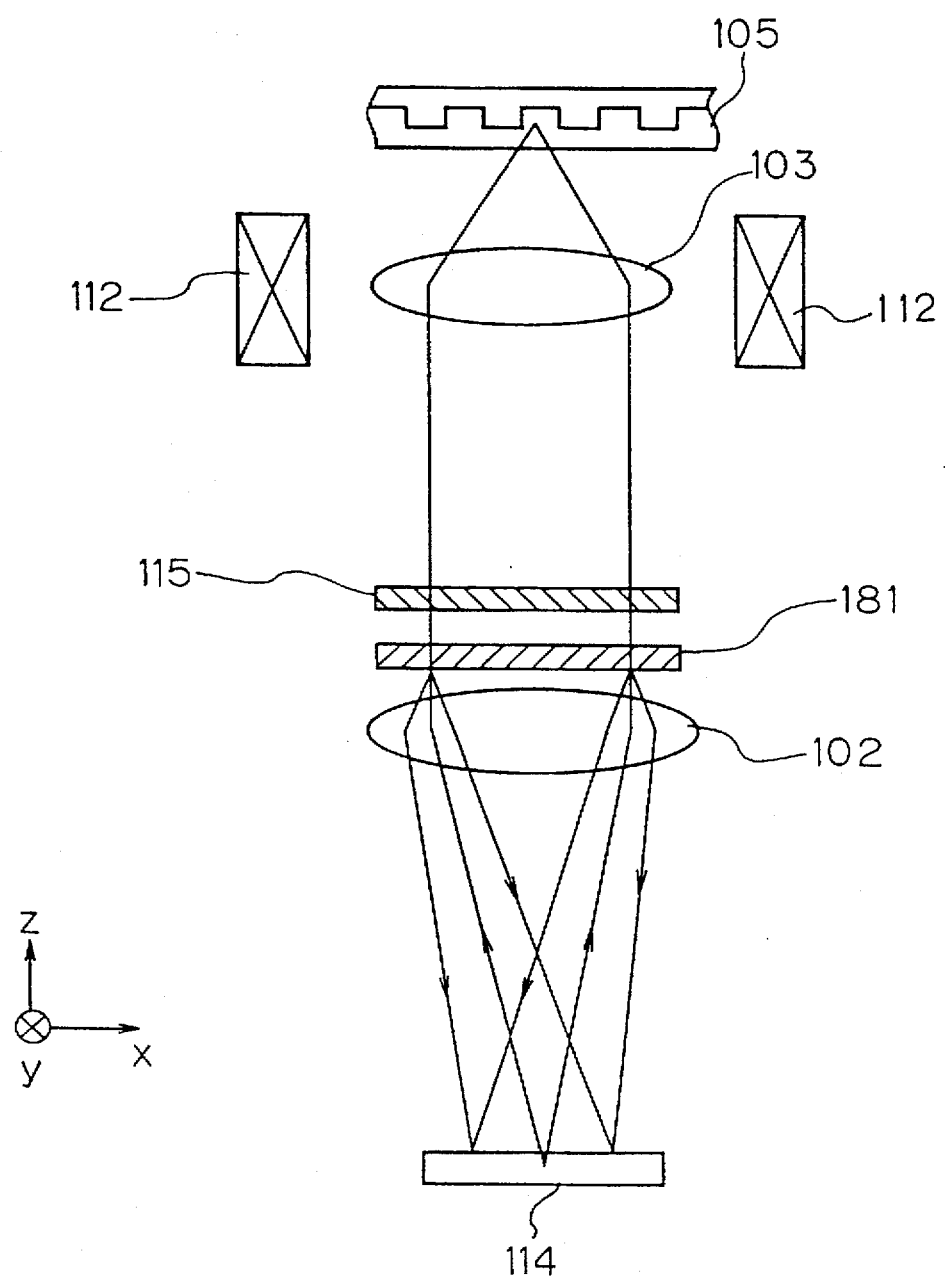
FIG. 13 is a side view of the optical head device of a sixth embodiment of the present invention.

FIG. 13 is a side view of the optical head device of the sixth embodiment of the present invention. In the sixth embodiment, the λ/4 plate 115 and the polarizing holographic beam splitter 181 are remotely located from the objective lens 103. The polarizing holographic beam splitter 181 and the LD-PD module 114 are substantially identical with those of the first through fifth embodiments.

The tracking error signal TE and the focus error signal FE are detected in manners similar to the first through fifth embodiments.

The sixth embodiment is effective in the case that the thickness of the portion of the objective lens 103 must be reduced, for example that a thin optical head device is required.

A holographic optical element in the sixth embodiment is not limited to the polarizing holographic beam splitter 181. One of the polarizing holographic beam splitters 182 and 183 is usable by dividing the detection areas of the photodetectors 191 and 192 in accordance with a polarizing holographic beam splitter used therein.

The optical head device of the sixth embodiment comprises the features of the optical head device of the third embodiment. In the embodiment, the polarizing holographic beam splitter 181 is formed by the polarizing holographic beam splitter as shown in FIG. 3. A holographic optical element of which the diffraction efficiency is different in the polarization direction is usable for the polarizing holographic beam splitter 181. For example, the holographic optical element disclosed in the Japanese published unexamined patent application Sho 63-31450 is usable. Moreover, the holographic optical element using liquid crystal is also usable. Furthermore, the LD-PD module 114 is the LD-PD module shown in FIG. 2, but is not limited thereto. An LD-PD module of which the semiconductor laser and the photodetectors are configurated in one monolithic body is usable, and the LD-PD module shown in FIG. 6 or FIG. 7 is usable, for example.

[Seventh embodiment]

Figure 14:
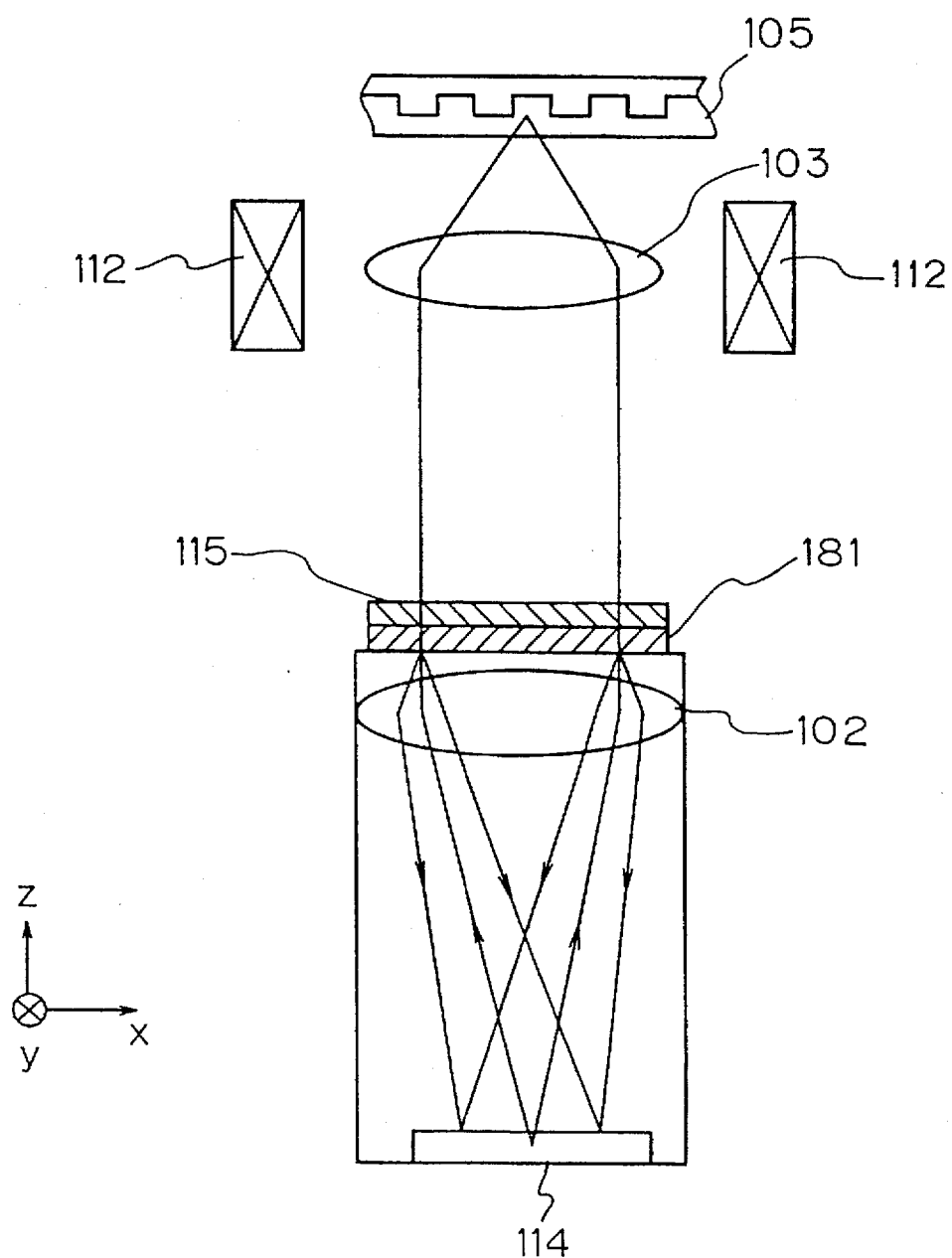
FIG. 14 is a side view of the optical head device of a seventh embodiment of the present invention.

FIG. 14 is a side view of the optical head device of the seventh embodiment of the present invention. In the seventh embodiment, the LD-PD module 114, collimating lens 102, polarizing holographic beam splitter 181 and λ/4 plate 115 in the sixth embodiment are configurated in one body. Since the optical system is formed by one module as mentioned above, the positional relation among these elements is accurately maintained. Consequently, a stable optical system is realizable.

Moreover, the module can be used as a common element in optical head devices of a various type or a various shape. Therefore, fabrication cost of the optical head device can be reduced by effect of mass production.

In the seventh embodiment, the polarizing holographic beam splitter 181 is used for a holographic optical element. The holographic optical element is not limited to the polarizing holographic beam splitter 181. One of the polarizing holographic beam splitters 182 and 183 is usable by dividing the detection areas of the photodetectors 191 and 192 in accordance with a polarizing holographic beam splitter used therein.

In the embodiment, the polarizing holographic beam splitter 181 is formed by the polarizing holographic beam splitter as shown in FIG. 3. A holographic optical element of which the diffraction efficiency is different in the polarization direction is usable for the polarizing holographic beam splitter 181. For example, the holographic optical element disclosed in the Japanese published unexamined patent application Sho 63-314502 is usable. Moreover, the holographic optical element using liquid crystal is also usable. Furthermore, the LD-PD module 114 is the LD-PD module shown in FIG. 2, but is not limited thereto. An LD-PD module of which the semiconductor laser and the photodetectors are configurated in one body is usable, and the LD-PD module shown in FIG. 6 or FIG. 7 is also usable, for example.

[Eighth embodiment]

Figure 15:
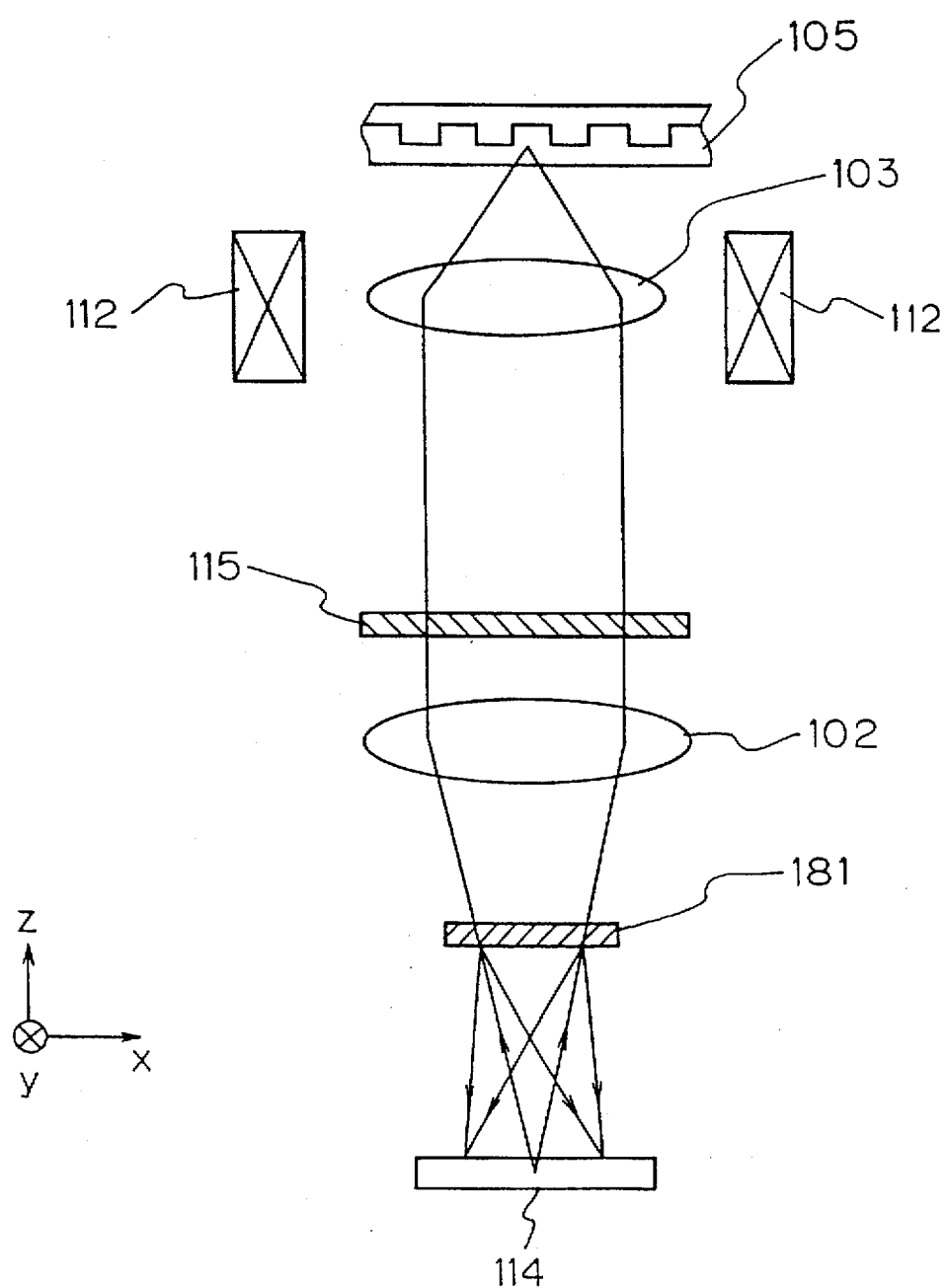
FIG. 15 is a side view of the optical head device of an eighth embodiment of the present invention.

FIG. 15 is a side view of the optical head device of the eighth embodiment of the present invention. In the eighth embodiment, the polarizing holographic beam splitter 181 in the sixth embodiment is arranged between the LD-PD module 114 and the collimating lens 102.

According to the eighth embodiment, since the polarizing holographic beam splitter 181 is arranged adjacent to the LD-PD module 114, further stable optical head device is realizable. Moreover, the diameter of the polarizing holographic beam splitter 181 can be reduced, and thus the fabrication cost of the optical head device can be also reduced.

In the eighth embodiment, though the polarizing holographic beam splitter 181 is used for a holographic optical element, the holographic optical element is not limited to the polarizing holographic beam splitter 181. One of the polarizing holographic beam splitters 182 and 183 is usable by dividing the detection areas of the photodetectors 191 and 192 in accordance with a polarizing holographic beam splitter used therein. Moreover, in the eighth embodiment, the λ/4 plate 115 can be arranged between the collimating lens 102 and the polarizing holographic beam splitter 181, for example.

In the embodiment, the polarizing holographic beam splitter 181 is formed by the polarizing holographic beam splitter as shown in FIG. 3. A holographic optical element of which the diffraction efficiency is different in the polarization direction is usable for the polarizing holographic beam splitter 181. For example, the holographic optical element disclosed in the Japanese published unexamined patent application Sho 63-314502 is usable. Moreover, the holographic optical element using liquid crystal is also usable. Furthermore, the LD-PD module 114 is the LD-PD module as shown in FIG. 2, but is not limited thereto. An LD-PD module of which the semiconductor laser and the photodetectors are configurated in one body is usable, and the LD-PD module as shown in FIG. 6 or FIG. 7 is also usable, for example.

[Ninth embodiment]

Figure 16:
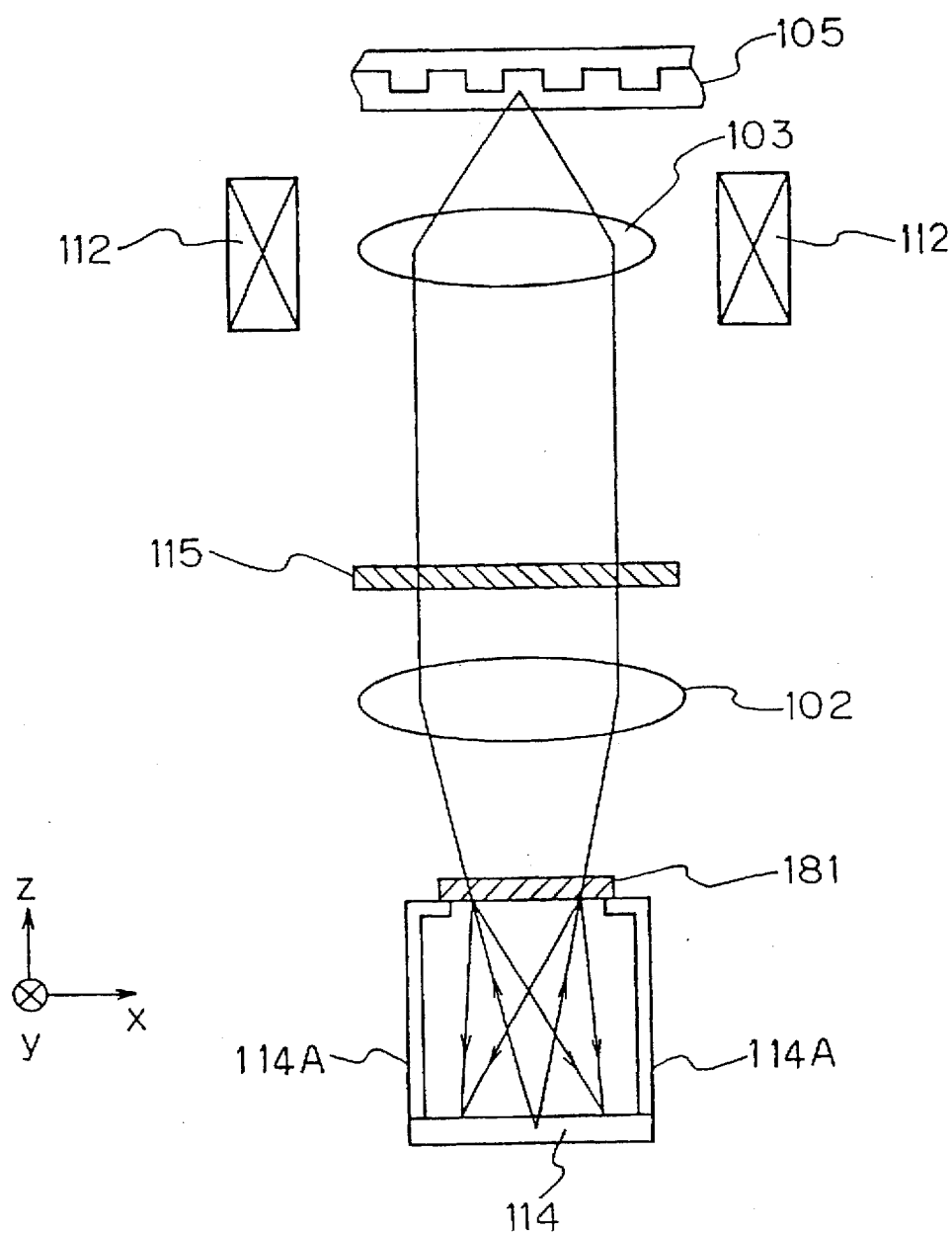
FIG. 16 is a side view of the optical head device of a ninth embodiment of the present invention.
Figure 17:
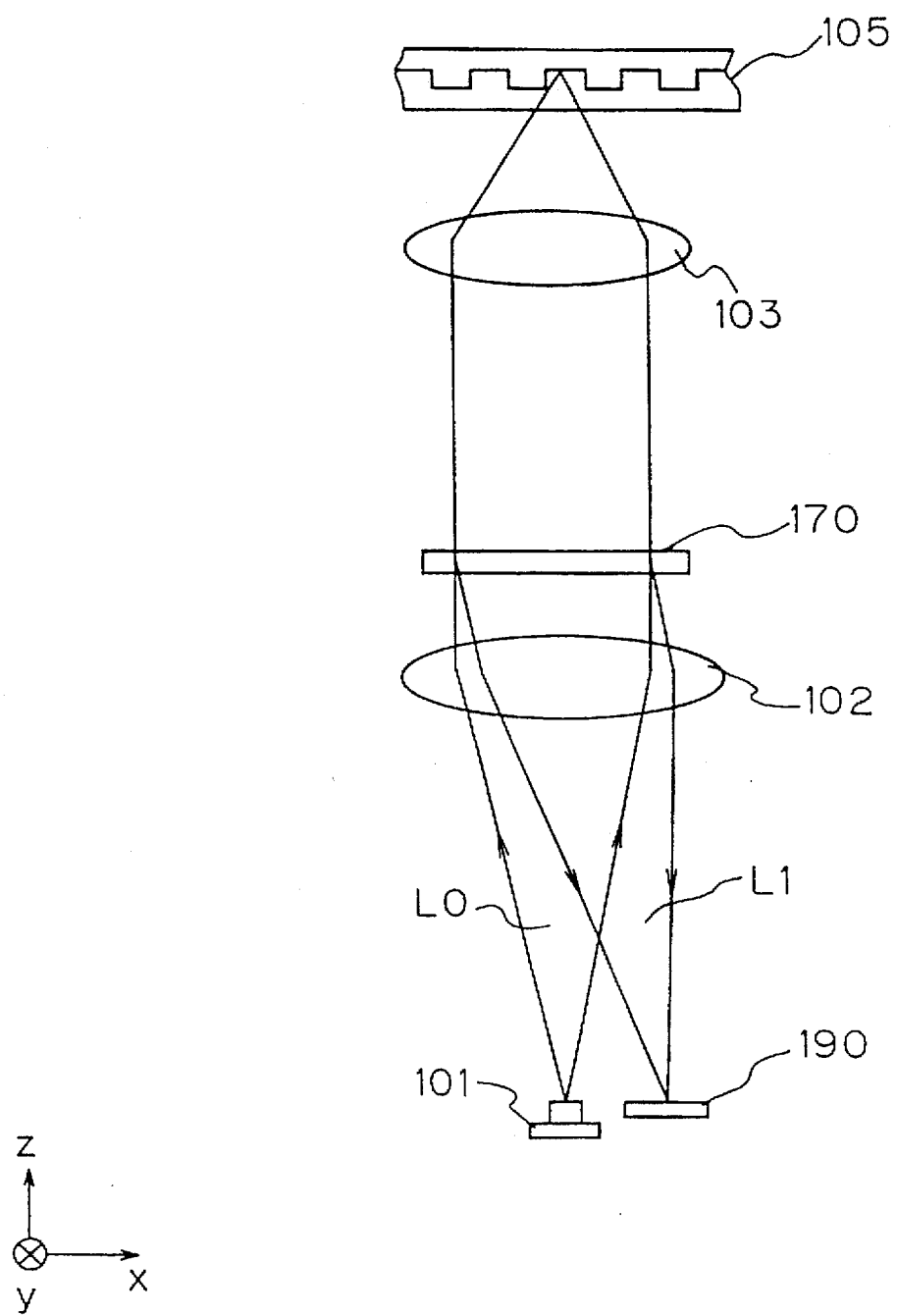
FIG. 17 is a side view of the first example of the optical head in the prior art.
Figure 18:
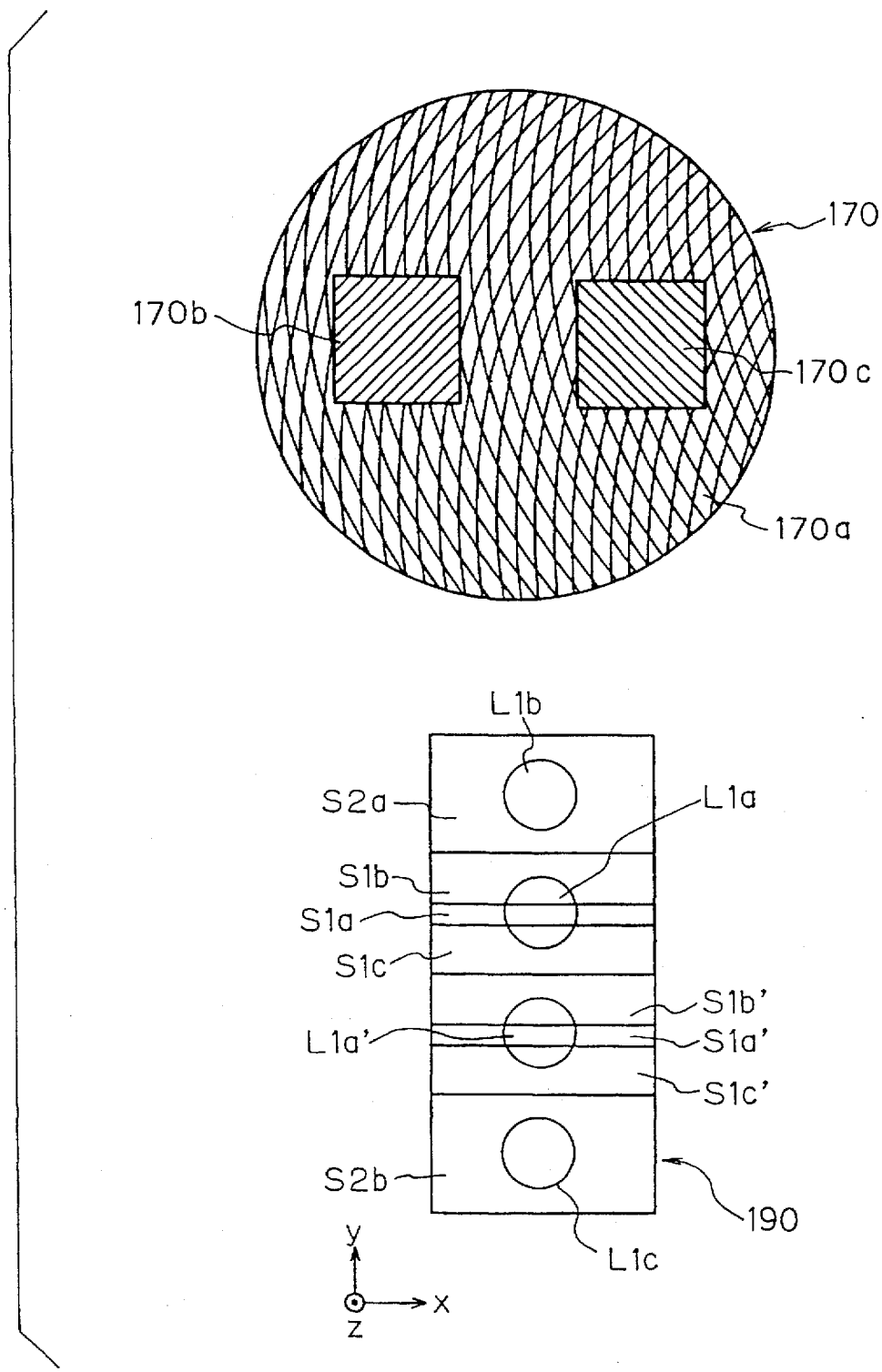
FIG. 18 is the plan view illustrating the positional relation between the holographic optical element and the photodetector in the first example of the prior art.
Figure 19:
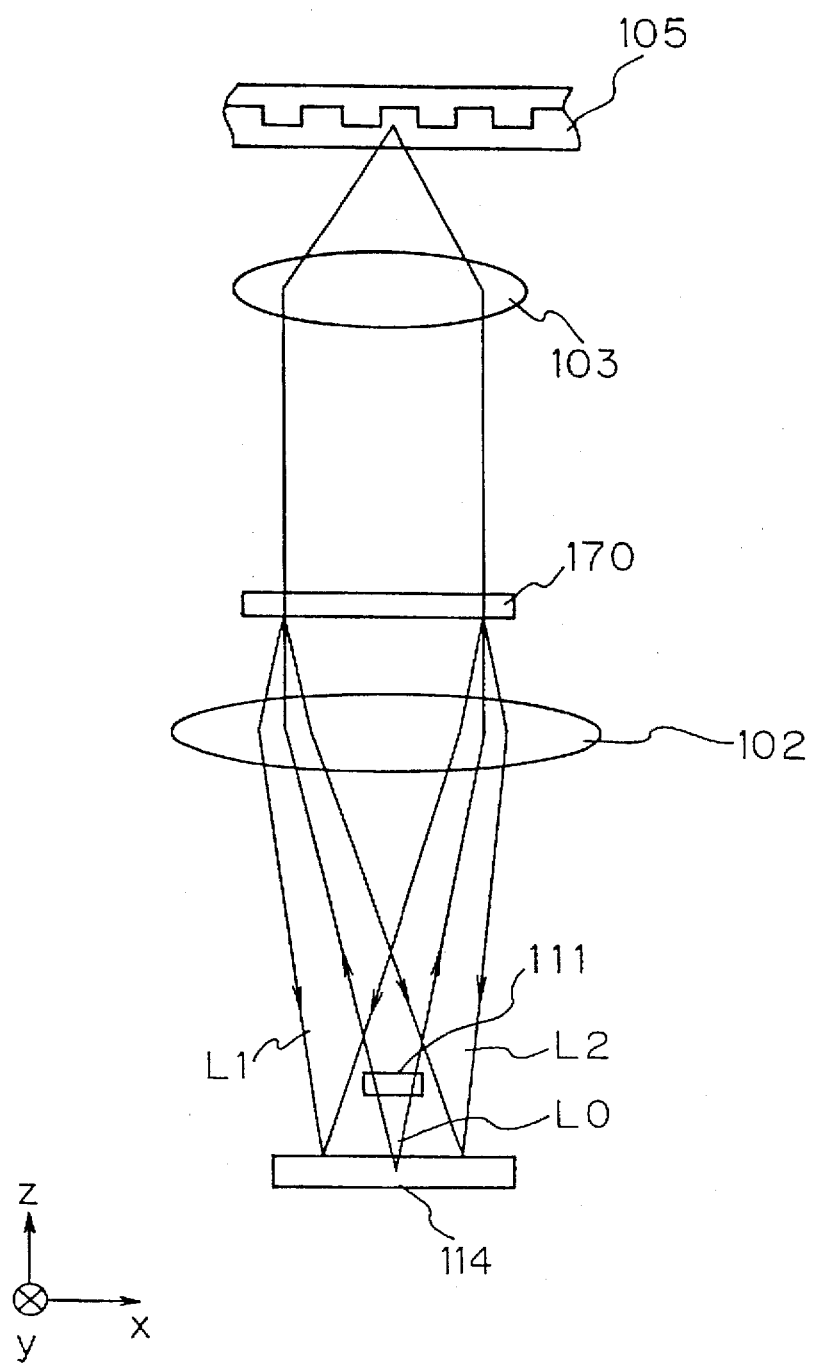
FIG. 19 is the side view of the second example of the optical head device in the prior art.
Figure 20:
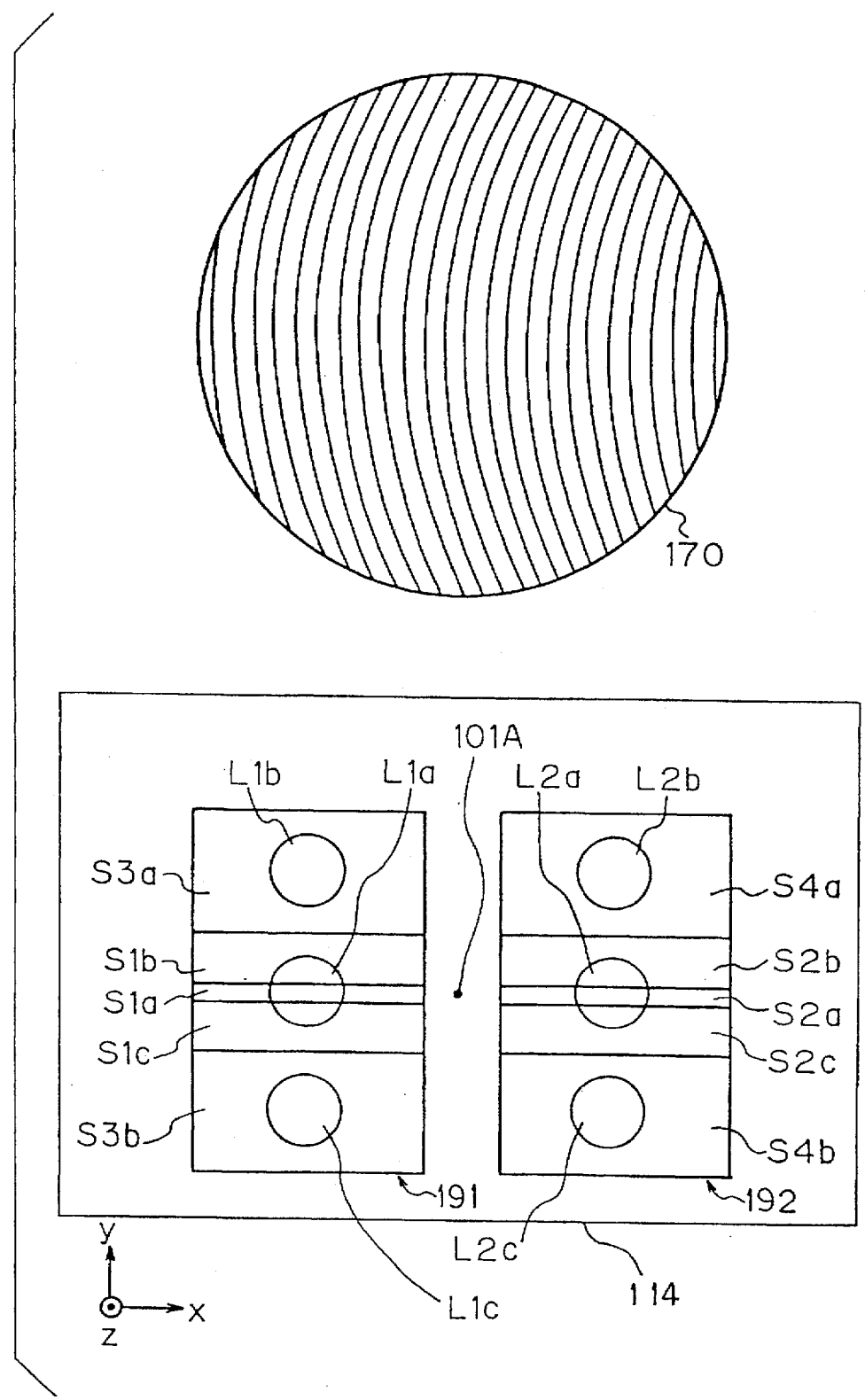
FIG. 20 is the plan view illustrating the positional relation between the holographic optical element and the LD-PD module of the optical head device in the second example of the prior art.

FIG. 16 is a side view of the optical head device of the ninth embodiment of the present invention. In the ninth embodiment, the LD-PD module 114 and the polarizing holographic beam splitter 181 in the eighth embodiment are combined in one module by frame members 114A. Therefore, a stable optical system is realizable. The module is applicable to the optical head of various type and shape as a common part, and a fabrication cost of the optical head is reduced by effect of mass production.

In the ninth embodiment, the polarizing holographic beam splitter 181 is used for a holographic optical element. However, the holographic optical element is not limited to the polarizing holographic beam splitter 181, and one of the polarizing holographic beam splitters 181 (FIG. 4), 182 (FIG. 8) and 183 (FIG. 9) is usable. One of the polarizing holographic beam splitter 182 and 183 is usable by dividing the detection areas of the photodetectors 191 and 192 in accordance with a polarizing holographic beam splitter used therein. Moreover, in the above mentioned configuration, the λ/4 plate 115 can be arranged between the collimating lens 102 and the polarizing holographic beam splitter 181. Furthermore, the collimating lens 102 and the λ/4 plate 115 can be combined to a module comprising the LD-PD module and the polarizing holographic beam splitter 161. Moreover, the collimating lens 102 and the λ/4 plate 115 can be combined to the module in one body. Furthermore, the collimating lens 102 and the objective lens 103 can be replaced with one lens.

In the ninth embodiment, though the polarizing holographic beam splitter 181 is formed by the polarizing holographic beam splitter as shown in FIG. 3, a holographic optical element which is different in diffraction efficiency with respect to the polarization direction is usable for the polarizing holographic beam splitter 181. For example, the holographic optical element disclosed in the Japanese published unexamined patent application sho 63-314502 is usable, and the holographic optical element using liquid crystal is also usable.

Furthermore, the LD-PD module 114 is not limited to the configuration as shown in FIG. 2,. An LD-PD module in which the semiconductor laser and the photodetector are made in one body is usable, and the LD-PD module as shown in FIG. 6 or FIG. 7 is also usable, for example.

In all of the embodiments, a nonpolarizing holographic optical element which transmits a part of a light beam and diffracts a part of th light beam is usable as replacement for the polarizing holographic beam splitter, and the λ/4 plate can be removed from the optical system in this case.

Effects described below are realizable in the optical head in accordance with the present invention.

(1) Since the focus error signal can be obtained by using all of luminous flux of the diffracted light beam of +1st order, the focus error signal having a high intensity and a high signal-to-noise ratio (S/N) is obtainable.

By the similar reason mentioned above, uniform intensity distribution is realized in the diffracted light beam for detecting the focus error signal, and the focus error signal representing a high sensitivity is obtainable.

In the optical head device in accordance with the present invention, since the tracking error signal can be obtained by using all of luminous flux of the diffracted light beam of −1st order, the tracking error signal having a high intensity and a high signal-to-noise ratio (S/N) is obtainable.

By the similar reason mentioned above, even in the case that scratches exist on the optical disk, a stable detection of the signal is performed.

(2) In the optical head device in accordance with the present invention, since the information signal is detected by the photodetector of a signal area, only one head amplifier is required to amplify the detected signal of the photodetector. Therefore, by accumulation of noise of the plural head amplifiers is prevented, and the information signal is accurately detected.

Moreover, since the photodetector of the information signal is independently disposed, only a signal in a frequency band of the information signal is amplified by the head amplifier. Therefore, the frequency band of the head amplifier can be limited to that of the information signal. An inexpensive head amplifier of a low noise is usable in comparison with the head amplifier which is capable of amplifying a signal in a frequency band of the servo signal.

(3) In the optical head device of the present invention, since the focus error signal is obtained on the basis of the diffracted light beam of +1st order, the difference between the emission point of the semiconductor laser and the detection surface of the photodetector in the LD-PD module is out of the problem by designing the holographic optical element. Therefore, the LD-PD module is usable in the state of absence of the focus offset. Consequently, a miniaturized, inexpensive and stable optical head device is realizable.

What is claimed is:

1. An optical head device comprising:
    a radiation source for emitting a light beam,
    imaging optics for converging said light beam from said radiation source to a minute spot on an information recording medium,
    a holographic optical element for generating diffracted light beams of +n-th order and −n-th order (n: natural number) by diffracting a reflection light beam reflected by said information recording medium,
    a first photodetector having plural areas for detecting a focus error signal and a tracking error signal on the basis of only a first diffracted light beam of +n-th order of said diffracted light beams, and
    a second photodetector for detecting an information signal on the basis of only a second diffracted light beam of −n-th order of said diffracted light beams.

2. An optical head device in accordance with claim 1, wherein said holographic optical element is divided into plural areas,
    a first diffracted light beam of +n-th order generated from a part of said plural areas of said holographic optical element is a spherical wave having a focal point at a position nearer to said holographic optical element than the surface of said first photodetector, and
    a second diffracted light beam of +n-th order generated from another part of said plural areas of said holographic optical element is a spherical wave having a focal point at a position farther from said holographic optical element than the surface of said first photodetector.

3. An optical head device in accordance with claim 1, wherein said holographic optical element is divided into plural areas, and
    a part of said holographic optical element produces diffracted light beams of +n-th order of both a spherical wave having a focal point at a position nearer to said holographic optical element than the surface of said first photodetector and a spherical wave having a focal point at a position farther from said holographic optical element than the surface of said first photodetector.

4. An optical head device in accordance with claim 1, wherein said holographic optical element is divided into plural areas, and a high beam passing through a part of said plural areas is converted to a light of a wave surface having a focal point on said first photodetector.

5. An optical head device in accordance with claim 1, wherein said radiation source is fixed on a substrate of said first photodetector and is placed at a level different from that including said first photodetector, and said holographic optical element is divided into plural areas, the light passing through a part of said plural areas of said holographic optical element is transformed to light with wave surfaces having a focal point on the surface of said first photodetector, and a focus error signal is derived by a knife-edge method.

6. An optical head device in accordance with claim 1, wherein a concavity is formed on the substrate of said first photodetector, said radiation source is mounted in said concavity, and a reflection mirror formed by a slanted sidewall of said concavity is provided to reflect the light beam emitted from said radiation source.

7. An optical head device in accordance with claim 1, wherein said radiation source is fixed on a substrate of said first photodetector, and the light beam is emitted from said radiation source with a predetermined angle with respect to the surface for fixing said radiation source.

8. An optical head device in accordance with claim 1, wherein the first photodetector for detecting said focus error signal and said tracking error signal has a push-pull type configuration.

9. An optical head device in accordance with claim 1, wherein said holographic optical element is divided into plural strip areas arranged in parallel to each other.

10. An optical head device comprising:

a radiation source for emitting a light beam, imaging optics for converging said light beam from said radiation source to a minute spot on an information recording medium, a holographic optical element for generating diffracted light beams by diffracting a reflection light beam reflected by said information recording medium, a first photodetector having detection areas divided into comb-shaped areas for detecting a focus error signal and a tracking error signal on the basis of a first diffracted light beam of +n-th order (n: natural number) of said diffracted light beams, and a second photodetector having plural areas for detecting an information signal on the basis of a second diffracted light beam of −n-th order (n: natural number) of said diffracted light beams.

11. An optical head device comprising:

a radiation source for emitting a light beam, imaging optics for converging said light beam from said radiation source to a minute spot on an information recording medium, a holographic optical element for generating diffracted light beams by diffracting a reflection light beam reflected by said information recording medium, a first photodetector having detection areas of which each detection area comprises a rectangular area and an area surrounding at least three sides of said rectangular area for detecting a focus error signal and a tracking error signal on the basis of a first diffracted light beam of +n-th order (n: natural number) of said diffracted light beams, and a second photodetector having plural areas for detecting an information signal on the basis of a second diffracted light beam of −n-th order (n: natural number) of said diffracted light beams.

* * * * *